(12) United States Patent
Suzuki et al.

(10) Patent No.: US 11,774,285 B2
(45) Date of Patent: Oct. 3, 2023

(54) FOURIER SPECTROSCOPIC ANALYZER

(71) Applicant: Yokogawa Electric Corporation, Tokyo (JP)

(72) Inventors: Yasuyuki Suzuki, Tokyo (JP); Masashi Nishi, Tokyo (JP); Yukihiro Nakamura, Tokyo (JP); Tetsushi Namatame, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 253 days.

(21) Appl. No.: 17/423,785

(22) PCT Filed: Jan. 21, 2020

(86) PCT No.: PCT/JP2020/001871
§ 371 (c)(1),
(2) Date: Jul. 16, 2021

(87) PCT Pub. No.: WO2020/153337
PCT Pub. Date: Jul. 30, 2020

(65) Prior Publication Data
US 2022/0113187 A1 Apr. 14, 2022

(30) Foreign Application Priority Data
Jan. 25, 2019 (JP) .................. 2019-011586

(51) Int. Cl.
*G01J 3/45* (2006.01)
*G01J 3/02* (2006.01)
(Continued)

(52) U.S. Cl.
CPC ............... *G01J 3/021* (2013.01); *G01B 9/02* (2013.01); *G01J 3/45* (2013.01); *G01J 2003/102* (2013.01); *G01J 2003/4538* (2013.01)

(58) Field of Classification Search
CPC .......... G01J 3/45; G01J 3/02; G01J 2003/102; G01J 2003/4538; G01J 3/10; G01J 3/4535;
(Continued)

(56) References Cited

U.S. PATENT DOCUMENTS

| 9,261,405 B2 * | 2/2016 | Hirao ................ G01J 3/0289 |
| 2014/0336972 A1 | 11/2014 | Juhl |
| 2020/0278256 A1 | 9/2020 | Suzuki et al. |

FOREIGN PATENT DOCUMENTS

| EP | 3686568 A1 | 7/2020 |
| JP | 2019-52994 A | 4/2019 |
| WO | 2013/179572 A1 | 12/2013 |

OTHER PUBLICATIONS

Nanko et al., "Near Infrared Spectral Analyzer InfraSpec NR800", Yokogawa technical report, 2001, vol. 45, No. 3, total 8 pages; Partial English translation.

* cited by examiner

*Primary Examiner* — Abdullahi Nur
(74) *Attorney, Agent, or Firm* — Rankin, Hill & Clark LLP

(57) ABSTRACT

A Fourier spectroscopic analyzer includes: a first light source that emits light including a wavelength component in a first wavelength band which is a wavelength band in which a spectrum of light passing through a sample is acquired and a wavelength component in a second wavelength band different from the first wavelength band; a second light source that emits light including the wavelength component in the second wavelength band; an interferometer that acquires an interferogram which is coherent light from the light emitted from the first light source; a first light coupling optical system that couples light emitted from the second light source to at least one of light emitted from the first light
(Continued)

source and the interferogram acquired by the interferometer; a light receiver that outputs a first light-reception signal acquired by receiving light including the wavelength component in the first wavelength band out of the wavelength components included in the light passing through the sample and a second light-reception signal acquired by receiving light including the wavelength component in the second wavelength band; and a signal processor that performs a Fourier transform process on the first light-reception signal and the second light-reception signal to acquire a spectrum of the wavelength component in the first wavelength band with noise removed therefrom.

15 Claims, 16 Drawing Sheets

(51) Int. Cl.
  *G01J 3/10* (2006.01)
  *G01J 3/453* (2006.01)
  *G01B 9/02* (2022.01)
(58) Field of Classification Search
  CPC ...... G01J 3/453; G01J 2003/4534; G01J 3/36;
    G01J 3/2803; G01B 9/02; G01B 9/0207
  See application file for complete search history.

FOURIER SPECTROSCOPIC ANALYZER

TECHNICAL FIELD

The present invention relates to a Fourier spectrum analyzer.

Priority is claimed on Japanese Patent Application No. 2019-011586, filed Jan. 25, 2019, the content of which is incorporated herein by reference.

BACKGROUND ART

A Fourier spectroscopic analyzer is a device that analyzes a sample by irradiating the sample with light including a plurality of wavelength components, receiving light passing through the sample, and performing a Fourier transform process on the acquired light-reception signal to acquire a spectrum, for example, a wavenumber spectrum, of light passing through the sample. The Fourier spectroscopic analyzer includes a light source that emits light including a plurality of wavelength components, an interferometer that acquires light which is applied to a sample (coherent light, which is also referred to as an interferogram) by causing beams of light emitted from the light source to interfere with each other, a light receiver that receives light passing through the sample (also referred to as reflected light or transmitted light), and a signal processor that performs the Fourier transform process.

For example, a Michelson interferometer including a half mirror, a fixed mirror, and a mobile mirror can be used as the interferometer. This interferometer acquires an interferogram which is applied to a sample by dividing light emitted from a light source into first divided light traveling to the fixed mirror and second divided light traveling to the mobile mirror using the half mirror and causing the first divided light reflected by the fixed mirror and the second divided light reflected by the mobile mirror to interfere with each other.

Non Patent Literature 1 discloses an example of a Fourier spectroscopic analyzer according to the related art. Specifically, Non Patent Literature 1 discloses a Fourier spectroscopic analyzer that can exclude an influence of an environmental variation such as a temperature change by dividing an interferogram into two interferograms, individually receiving an interferogram passing through a sample and an interferogram not passing through the sample, performing the Fourier transform process on the acquired light-reception signals to acquire spectra thereof, and performing a correction process using the two spectra.

CITATION LIST

Non Patent Literature

[Non Patent Literature 1]
Tomoaki NANKO and two others, "Near-infrared Spectroscopy System InfraSpec NR800," Yokokawa's Technical Report, Vol. 45, No. 3, 2001

SUMMARY OF INVENTION

Technical Problem

The Fourier spectroscopic analyzer acquires an interferogram which is modulated light by causing a change in an optical path length difference indicating a difference between an optical path length of the first divided light and an optical path length of the second divided light using a mobile mirror provided in the interferometer. Accordingly, a sample which is analyzed by the Fourier spectroscopic analyzer is basically based on the premise that there is no change with time in optical characteristics or that a change speed is much slower than a moving speed of the mobile mirror provided in the interferometer even if there is a change with time in optical characteristics.

On the other hand, when the Fourier spectroscopic analyzer is used in various fields, it is conceivable that a sample of which optical characteristics change faster with respect to the moving speed of the mobile mirror will be used as an analysis target. For example, in industrial processes or chemical processes, it is conceivable that fluid or particulate matter in which particles float, a mobile object on which a light scattering surface including an uneven surface is formed, or a sample with fluidity which is agitated and suspended in an agitation vessel will be used as an analysis target of the Fourier spectroscopic analyzer.

When such a sample of which optical characteristics change relatively fast is analyzed using the Fourier spectroscopic analyzer, an interferogram passing through the sample changes due to a change with time in optical characteristics of the sample. In other words, an interferogram passing through a sample is modulated due to a change with time in optical characteristics of the sample. Accordingly, noise including many low-frequency components, so-called "coloring noise," is superimposed on an interferogram passing through the sample. Noise superimposed on the interferogram remains as noise even if a Fourier transform process is performed thereon, and thus analysis accuracy may decrease.

An aspect of the invention provides a Fourier spectroscopic analyzer that can realize high analysis accuracy for even a sample of which a change with time in optical characteristics occurs.

Solution to Problem (1) A Fourier spectroscopic analyzer according to one aspect of the present application includes: a first light source that emits light including a wavelength component in a first wavelength band which is a wavelength band in which a spectrum of light passing through a sample is acquired and a wavelength component in a second wavelength band different from the first wavelength band; a second light source that emits light including the wavelength component in the second wavelength band; an interferometer that acquires an interferogram which is coherent light from the light emitted from the first light source; a first light coupling optical system that couples light emitted from the second light source to at least one of light emitted from the first light source and the interferogram acquired by the interferometer; a light receiver that outputs a first light-reception signal acquired by receiving light including the wavelength component in the first wavelength band out of the wavelength components included in the light passing through the sample and a second light-reception signal acquired by receiving light including the wavelength component in the second wavelength band; and a signal processor that performs a Fourier transform process on the first light-reception signal and the second light-reception signal to acquire a spectrum of the wavelength component in the first wavelength band with noise removed therefrom.

(2) In the above-described Fourier spectroscopic analyzer, the first light coupling optical system may be provided between the interferometer and the sample and couple light emitted from the second light source to the interferogram acquired by the interferometer.

(3) In the above-described Fourier spectroscopic analyzer, the first light coupling optical system may be provided between the first light source and the interferometer and couple light emitted from the second light source to light emitted from the first light source.

(4) In the above-described Fourier spectroscopic analyzer, the light receiver may include: a first detector configured to receive a wavelength component in a third wavelength band including the first wavelength band and the second wavelength band; a second detector configured to receive the wavelength component in the third wavelength band; and a divider configured to divide the light passing through the sample into the wavelength component in the first wavelength band which is incident on the first detector and the wavelength component in the second wavelength band which is incident on the second detector.

(5) In the above-described Fourier spectroscopic analyzer, the divider may include a dichroic mirror that reflects the wavelength component in the first wavelength band and transmits the wavelength component in the second wavelength band.

(6) In the above-described Fourier spectroscopic analyzer, the divider may include a dichroic mirror that transmits the wavelength component in the first wavelength band and reflects the wavelength component in the second wavelength band.

(7) In the above-described Fourier spectroscopic analyzer, the divider may include: a half mirror that divides the light passing through the sample into first light traveling to the first detector and second light traveling to the second detector; a first filter that extracts the wavelength component in the first wavelength band from the wavelength component included in the first light and causes the extracted wavelength component to be incident on the first detector; and a second filter that extracts the wavelength component in the second wavelength band from the wavelength component included in the second light and causes the extracted wavelength component to be incident on the second detector.

(8) In the above-described Fourier spectroscopic analyzer, the light receiver may include: a first detector in which a detection sensitivity to the wavelength component in the first wavelength band is higher than that to the wavelength component in the second wavelength band; and a second detector in which a detection sensitivity to the wavelength component in the second wavelength band is higher than that to the wavelength component in the first wavelength band.

(9) In the above-described Fourier spectroscopic analyzer, the first detector and the second detector may be sequentially disposed on an optical path of the light passing through the sample.

(10) In the above-described Fourier spectroscopic analyzer, the signal processor may: individually perform the Fourier transform process on the first light-reception signal and the second light-reception signal to acquire a first Fourier transform signal for the first light-reception signal and a second Fourier transform signal for the second light-reception signal; remove noise from the first Fourier transform signal on the basis of the first Fourier transform signal and the second Fourier transform signal; and calculate a spectrum of the first light-reception signal on the basis of the first Fourier transform signal from which noise has been removed.

(11) In the above-described Fourier spectroscopic analyzer, the first light source may be a halogen lamp, and the second light source may be a light source including a semiconductor light-emitting element.

(12) The above-described Fourier spectroscopic analyzer may further include a memory that stores the first light-reception signal and the second light-reception signal, wherein the signal processor may calculate the spectrum using the first light-reception signal and the second light-reception signal which are stored in the memory.

(13) In the above-described Fourier spectroscopic analyzer, the first light source may emit light of 1 [μm] to 2.5 [μm] as the first wavelength band and emits light of 0.5 [μm] to 1 [μm] as the second wavelength band.

(14) In the above-described Fourier spectroscopic analyzer, the Fourier spectroscopic analyzer may further include: a third light source that emits light including the wavelength component in the first wavelength band; and a second light coupling optical system that is provided between the first light source and the interferometer and couples light emitted from the third light source to light emitted from the first light source.

(15) The above-described Fourier spectroscopic analyzer may further include: a third light source that emits light including the wavelength component in the first wavelength band; and a second light coupling optical system that is provided between the interferometer and the sample and couples light emitted from the third light source to the interferogram acquired by the interferometer.

Advantageous Effects of Invention

According to the aspect of the invention, it is possible to realize high analysis accuracy for even a sample of which a change with time in optical characteristics occurs.

DESCRIPTION OF EMBODIMENTS

Hereinafter, a Fourier spectroscopic analyzer according to an embodiment of the invention will be described in detail with reference to the accompanying drawings.

First Embodiment

<Principal Configuration of Fourier Spectroscopic Analyzer>

Figure 1:
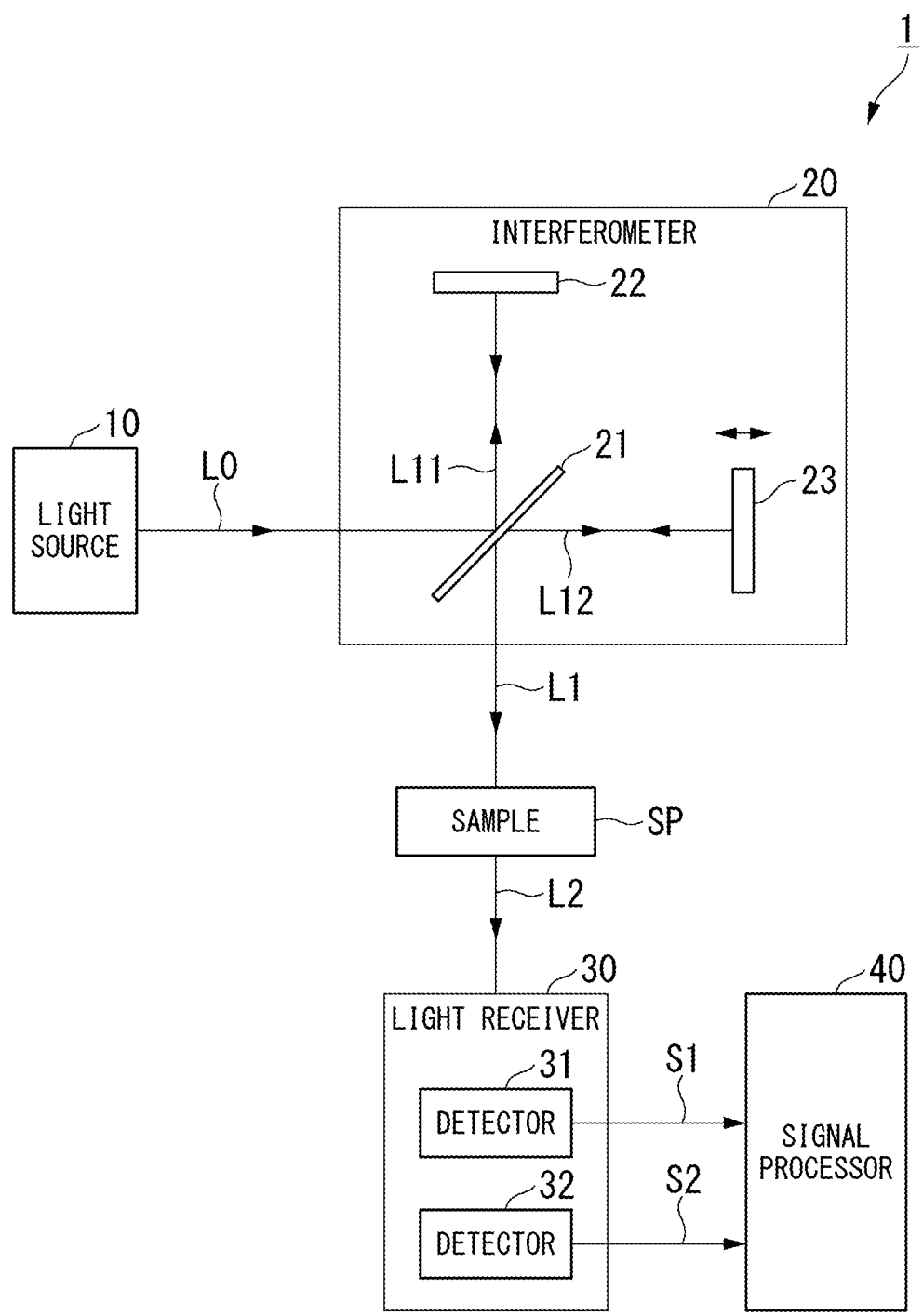
FIG. 1 is a block diagram illustrating a principal configuration of a Fourier spectroscopic analyzer according to a first embodiment of the invention.

FIG. 1 is a block diagram illustrating a principal configuration of a Fourier spectroscopic analyzer according to a first embodiment of the invention. As illustrated in FIG. 1, the Fourier spectroscopic analyzer 1 according to the first embodiment includes a light source 10 (also referred to as a first light source), an interferometer 20, a light receiver 30, and a signal processor 40. The Fourier spectroscopic analyzer 1 analyzes a sample SP by irradiating the sample SP with light L1 including a plurality of wavelength components, receiving light L2 passing through the sample SP, and performing a Fourier transform process on the acquired light-reception signals S1 and S2 to acquire a spectrum of the light L2 passing through the sample SP, for example, a wavenumber spectrum.

An arbitrary material can be used as the sample SP, and it is assumed that a material of which optical characteristics change with time is used in the first embodiment. For example, a fluid or particulate matter in which particles float, a mobile object on which a light scattering surface including an uneven surface is formed, or a sample with fluidity which is agitated and suspended in an agitation vessel in industrial processes or chemical processes can be used. Examples of the light L2 passing through the sample SP include reflected light reflected by the sample SP and transmitted light transmitted by the sample SP, and it is assumed that transmitted light transmitted by the sample SP is used in the first embodiment.

The light source 10 is a light source that emits light L0 including a plurality of wavelength components. An arbitrary light source can be used as the light source 10 according to optical characteristics of the sample SP. For example, a light source having a broad wavelength band such as a halogen lamp or a light source including a semiconductor light-emitting element such as a laser diode (LD) or a light emitting diode (LED) can be used. In the first embodiment, a halogen lamp is used as the light source 10. For example, the wavelength band width of the halogen lamp has a range of about 350 [nm] to 4500 [nm].

The interferometer 20 causes beams of light L0 emitted from the light source 10 to interfere with each other and acquires light (coherent light, which is also referred to as an interferogram) L1 which is applied to a sample. An arbitrary interferometer can be used as the interferometer 20, and it is assumed that a Michelson interferometer including a half mirror 21, a fixed mirror 22, and a mobile mirror 23 is used as the interferometer 20 in the first embodiment.

The half mirror 21 divides the light L0 emitted from the light source 10 into divided light L11 traveling to the fixed mirror 22 and divided light L12 traveling to the mobile mirror 23. The half mirror 21 divides the light L0 emitted from the light source 10, for example, at an intensity ratio of 1:1. The half mirror 21 causes the divided light L11 reflected by the fixed mirror 22 and the divided light L12 reflected by the mobile mirror 23 to interfere with each other to acquire an interferogram L1.

The fixed mirror 22 is disposed on an optical path of the divided light L11 in a state in which a reflecting surface thereof faces the half mirror 21. The fixed mirror 22 reflects the divided light L11 divided by the half mirror 21 toward the half mirror 21. The mobile mirror 23 is disposed on an optical path of the divided light L12 in a state in which a reflecting surface thereof faces the half mirror 21. The mobile mirror 23 reflects the divided light L12 divided by the half mirror 21 toward the half mirror 21. The mobile mirror 23 is configured to reciprocate along the optical path of the divided light L12 through the use of a drive mechanism which is not illustrated. A reciprocating speed of the mobile mirror 23 is set to, for example, five times per second.

By causing the mobile mirror 23 to reciprocate, wavelength components included in the light L0 emitted from the light source 10 are modulated at different frequencies. For example, a wavelength component having a relatively small wavelength is intensity-modulated at a frequency higher than that of a wavelength component having a relatively large wavelength. In the interferogram L1 acquired by the interferometer 20, the wavelength components intensity-modulated at different frequencies are superimposed.

The light receiver 30 includes a detector 31 (also referred to as a first detector) and a detector 32 (also referred to as a second detector). The light receiver 30 receives light (also referred to as transmitted light of the interferogram L1) L2 passing through the sample SP and outputs a light-reception signal S1 (also referred to as a first light-reception signal) and a light-reception signal S2 (also referred to as a second light-reception signal). The detector 31 receives a wavelength component in a wavelength band (also referred to as a first wavelength band) of which a spectrum is calculated and outputs the light-reception signal S1. The detector 32 receives a wavelength component in a wavelength band (also referred to as a second wavelength band) different from the wavelength band of which the spectrum is calculated and outputs the light-reception signal S2.

The detector 31 is provided to calculate a spectrum in a prescribed wavelength band (also referred to as a first wavelength band) which is analyzed, and the detector 32 is provided to acquire noise due to a change with time in optical characteristics of the sample SP. In designing the Fourier spectroscopic analyzer 1, the first wavelength band can be set to an arbitrary wavelength band. In the first embodiment, it is assumed that the first wavelength band ranges from 1 [μm] to 2.5 [μm] and the second wavelength band ranges from 0.5 [μm] to 1 [μm].

The detectors 31 and 32 may be of the same type or of different types. For example, both of the detectors 31 and 32 may receive wavelength components in a wavelength band (also referred to as a third wavelength band) including the first wavelength band and the second wavelength band and may be of the same type. Alternatively, the detector 31 may have a relatively higher detection sensitivity to a wavelength component in the first wavelength band than a wavelength component in the second wavelength band, and the detector 32 may have a relatively higher detection sensitivity to a wavelength component in the second wavelength band than a wavelength component in the first wavelength band and be of a different type.

When the detectors 31 and 32 which are of the same type are used, it is necessary to provide a divider that divides the first wavelength band and the second wavelength band, to cause a wavelength component in the first wavelength band to be incident on the detector 31, and to cause a wavelength component in the second wavelength band to be incident on the detector 32. Details of the divider will be described later. On the other hand, when the detectors 31 and 32 which are of different types are used, the same divider as the aforementioned divider may be provided or the divider may be omitted.

The signal processor 40 performs a process of calculating a spectrum from which noise due to a change with time in optical characteristics of the sample SP has been removed using the light-reception signal S1 output from the detector 31 of the light receiver 30 and the light-reception signal S2 output from the detector 32. The signal processor 40 outputs a signal indicating the spectrum calculated through the aforementioned process to the outside or displays the signal on a display device which is not illustrated, for example, a liquid crystal display device.

<First Example of Light Receiver>

Figure 2A:
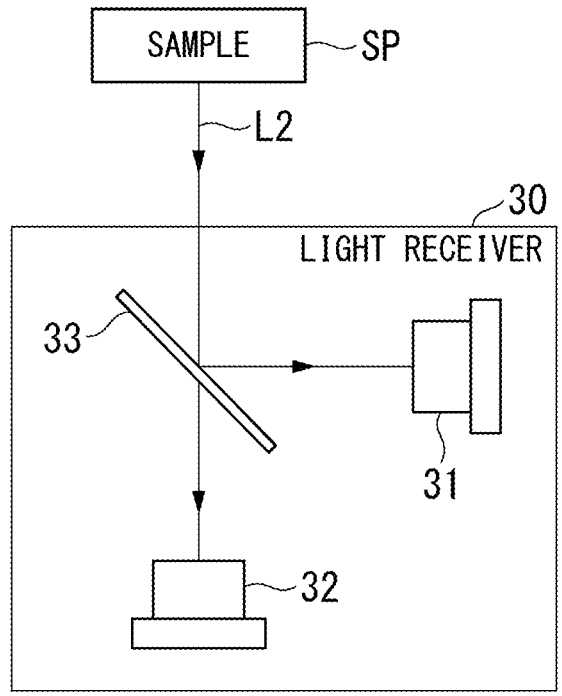
FIG. 2A is a block diagram illustrating a first example of a light receiver which is provided in the Fourier spectroscopic analyzer according to the first embodiment of the invention.

FIG. 2A is a block diagram illustrating a first example of the light receiver which is provided in the Fourier spectroscopic analyzer according to the first embodiment of the invention. As illustrated in FIG. 2A, the light receiver 30 in this example includes a dichroic mirror 33 (also referred to as a divider) in addition to the detectors 31 and 32. In this example, both of the detectors 31 and 32 can receive a wavelength component in a wavelength band (also referred to as a third wavelength band) including the first wavelength band and the second wavelength band.

Figure 2B:
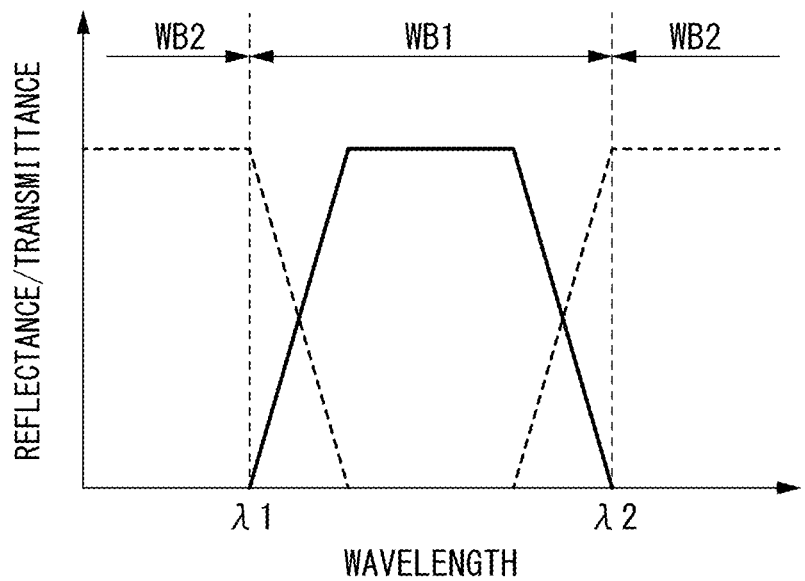
FIG. 2B is a diagram illustrating optical characteristics of the first example of the light receiver which is provided in the Fourier spectroscopic analyzer according to the first embodiment of the invention.

As illustrated in FIG. 2B, the dichroic mirror 33 has optical characteristics of reflecting a wavelength component in a first wavelength band WB1 out of wavelength components included in light L2 passing through the sample SP and transmitting a wavelength component in a second wavelength band WB2. The dichroic mirror 33 ideally has optical characteristics of fully reflecting the wavelength component in the first wavelength band WB1 and fully transmitting the wavelength component in the second wavelength band WB2, but may have optical characteristics of partially transmitting the wavelength component in the first wavelength band WB1 as illustrated in FIG. 2B.

For example, as illustrated in FIG. 2B, the dichroic mirror 33 may have optical characteristics in which a reflectance for wavelength components of both ends of the first wavelength band WB1, that is, wavelength components of wavelengths close to wavelengths λ1 and λ2 defining boundaries of the first wavelength band WB1 and the second wavelength band WB2, decreases gradually, that is, a transmittance increases gradually. In FIG. 2B, for the purpose of easy understanding, the optical characteristics of the dichroic mirror 33 at both ends of the first wavelength band WB1 are illustrated in an exaggerated manner.

When the detectors 31 and 32 are inversely disposed, the dichroic mirror 33 having inverse optical characteristics can be used. That is, when the detector 31 is disposed at the position of the detector 32 in FIG. 2A and the detector 32 is disposed at the position of the detector 31 in FIG. 2A, a dichroic mirror 33 having optical characteristics of transmitting a wavelength component in the first wavelength band WB1 out of the wavelength components included in light L2 passing through the sample SP and reflecting the wavelength component in the second wavelength band WB2 can be used.

<Second Example of Light Receiver>

Figure 3A:
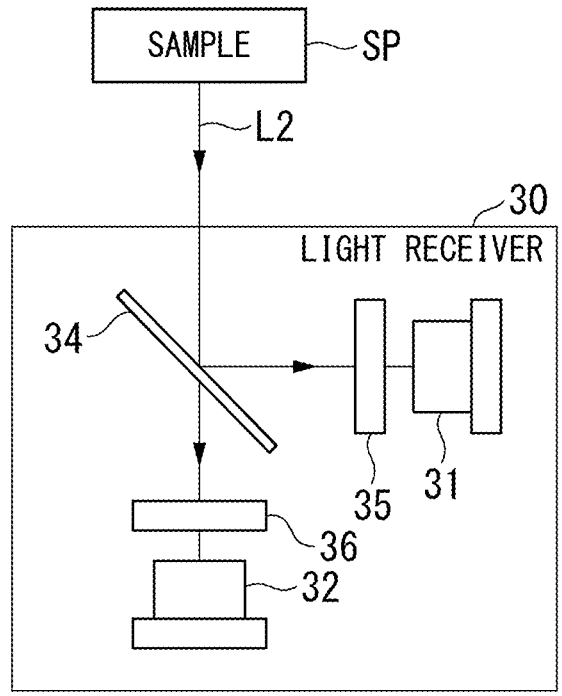
FIG. 3A is a block diagram illustrating a second example of the light receiver which is provided in the Fourier spectroscopic analyzer according to the first embodiment of the invention.

FIG. 3A is a block diagram illustrating a second example of the light receiver which is provided in the Fourier spectroscopic analyzer according to the first embodiment of the invention. As illustrated in FIG. 3A, the light receiver 30 in this example includes a half mirror 34 (also referred to as a divider), a filter 35 (a divider, which is also referred to as a first filter), and a filter 36 (a divider, which is also referred to as a second filter) in addition to the detectors 31 and 32. In this example, similarly to the first example, both of the detectors 31 and 32 can receive a wavelength component in a wavelength band (also referred to as a third wavelength band) including the first wavelength band and the second wavelength band.

Figure 3B:
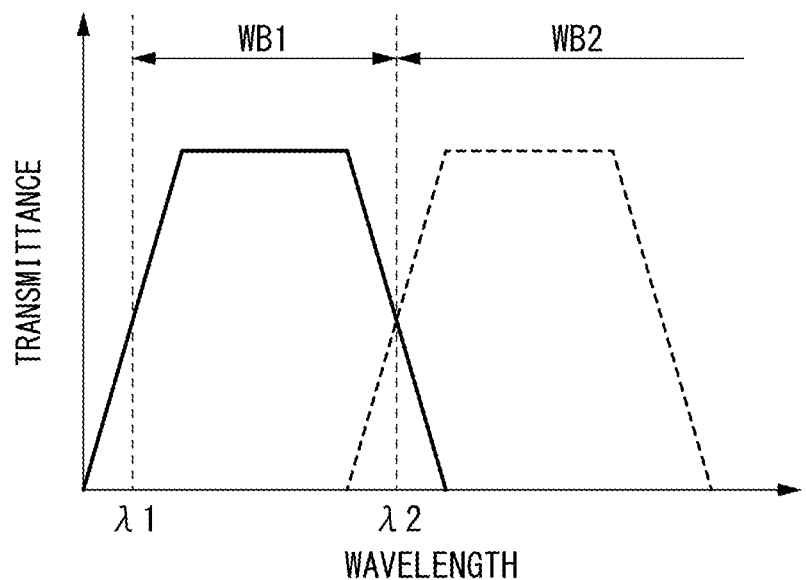
FIG. 3B is a diagram illustrating optical characteristics of the second example of the light receiver which is provided in the Fourier spectroscopic analyzer according to the first embodiment of the invention.

The half mirror 34 divides the light L2 passing through the sample SP into light (also referred to as first light) traveling to the detector 31 and light (also referred to as second light) traveling to the detector 32. The filter 35 is disposed on an optical path between the half mirror 34 and the detector 31. As illustrated in FIG. 3B, the filter 35 has optical characteristics of transmitting a wavelength component in the first wavelength band WB1 and not transmitting a wavelength component in the second wavelength band WB2. That is, the filter 35 has optical characteristics of extracting a wavelength component in the first wavelength band WB1 and causing the extracted wavelength component to be incident on the detector 31. The filter 36 is disposed on an optical path between the half mirror 34 and the detector 32. As illustrated in FIG. 3B, the filter 36 has optical characteristics of transmitting a wavelength component in the second wavelength band WB2 and not transmitting a wavelength component in the first wavelength band WB1. That is, the filter 36 has optical characteristics of extracting a wavelength component in the second wavelength band WB2 and causing the extracted wavelength component to be incident on the detector 32.

The filter 35 ideally has optical characteristics of transmitting only a wavelength component in the first wavelength band WB1 and the filter 36 ideally has optical characteristics of transmitting only a wavelength component in the second wavelength band WB2. However, as illustrated in FIG. 3B, the filter 35 may have optical characteristics of partially transmitting the wavelength component in the second wavelength band WB2 and the filter 36 may have optical characteristics of partially transmitting the wavelength component in the first wavelength band WB1. In FIG. 3B, for the purpose of easy understanding, the optical characteristics of filters 35 and 36 in the vicinity of a wavelength $\lambda 2$ defining a boundary between the first wavelength band WB1 and the second wavelength band WB2 are illustrated in an exaggerated manner.

When the detectors 31 and 32 are inversely disposed, the filters 35 and 36 can be inversely disposed. That is, when the detector 31 is disposed at the position of the detector 32 in FIG. 3A and the detector 32 is disposed at the position of the detector 31 in FIG. 3A, the filter 35 can be disposed at the position of the filter 36 in FIG. 3A and the filter 36 can be disposed at the position of the filter 35 in FIG. 3A.

<Third Example of Light Receiver>

Figure 4A:
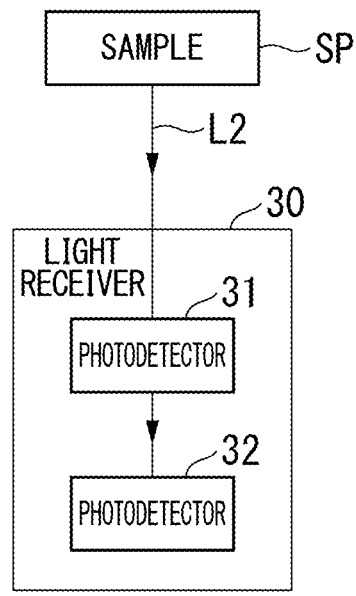
FIG. 4A is a block diagram illustrating a third example of the light receiver which is provided in the Fourier spectroscopic analyzer according to the first embodiment of the invention.
Figure 4B:
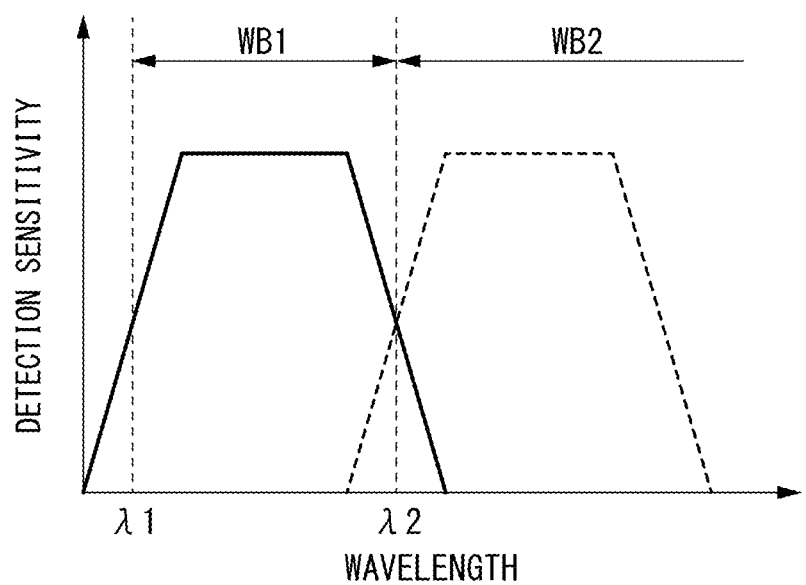
FIG. 4B is a diagram illustrating optical characteristics of the third example of the light receiver which is provided in the Fourier spectroscopic analyzer according to the first embodiment of the invention.

FIG. 4A is a block diagram illustrating a third example of the light receiver which is provided in the Fourier spectroscopic analyzer according to the first embodiment of the invention. As illustrated in FIG. 4A, the light receiver 30 in this example includes detectors 31 and 32 that are sequentially disposed on an optical path of the light L2 passing through the sample SP. In this example, as illustrated in FIG. 4B, the detector 31 has a higher detection sensitivity to a wavelength component in the first wavelength band WB1 than to the wavelength component in a second wavelength band WB2. The detector 32 has a higher detection sensitivity to a wavelength component in the second wavelength band WB2 than to a wavelength component in the first wavelength band WB1.

In this example, for example, an InGaAs (indium gallium arsenide) photo diode can be used as the detector 31. A Si (silicon) photo diode can be used as the detector 32. The InGaAs photo diode has a high detection sensitivity to light in a wavelength band of about 1 [μm] to 2.5 [μm]. The Si photo diode has a high detection sensitivity to light in a wavelength band of about 0.3 [μm] to 1 [μm].

In the light receiver 30 according to this example, when the light L2 passing through the sample SP is incident on the detector 31, a wavelength component in the first wavelength band WB1 is absorbed and converted to a light-reception signal S1. When the transmitted light is incident on the detector 32 via the detector 31, a wavelength component in the second wavelength band WB2 is absorbed and converted to a light-reception signal S2. The detectors 31 and 32 may be inversely disposed on the optical path of the light L2 passing through the sample SP. The detectors 31 and 32 may be disposed in a superimposed state on the optical path of the light L2 passing through the sample SP. For example, a detector disclosed in PCT International Publication No. WO2011/065057 can be used as such a detector.

<First Example of Signal Processor>

Figure 5:
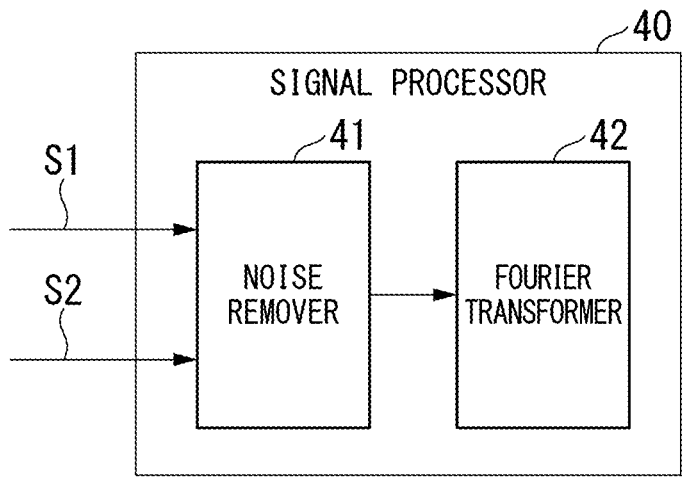
FIG. 5 is a block diagram illustrating a first example of a signal processor which is provided in the Fourier spectroscopic analyzer according to the first embodiment of the invention.

FIG. 5 is a block diagram illustrating a first example of the signal processor which is provided in the Fourier spectroscopic analyzer according to the first embodiment of the invention. As illustrated in FIG. 5, the signal processor 40 according to this example includes a noise remover 41 that receives light-reception signals S1 and S2 and a Fourier transformer 42 that receives an output signal of the noise remover 41.

The noise remover 41 performs a process of removing noise superimposed on the light-reception signal S1 using the light-reception signal S2. For example, the noise remover 41 removes noise superimposed on the light-reception signal S1 by performing a process of subtracting the light-reception signal S2 from the light-reception signal S1. As long as noise superimposed on the light-reception signal S1 can be removed, the process performed by the noise remover 41 may be an arbitrary process and is not limited to the process of subtracting the light-reception signal S2 from the light-reception signal S1.

The Fourier transformer 42 calculates a spectrum of a wavelength component in the first wavelength band by performing a Fourier transform process on a signal output from the noise remover 41. The signal output from the noise remover 41 is a signal from which noise due to a change with time in optical characteristics of the sample SP has been removed. Accordingly, noise due to a change with time in optical characteristics of the sample SP is removed in the spectrum of the wavelength component in the first wavelength band calculated by the Fourier transformer 42.

<Second Example of Signal Processor>

Figure 6:
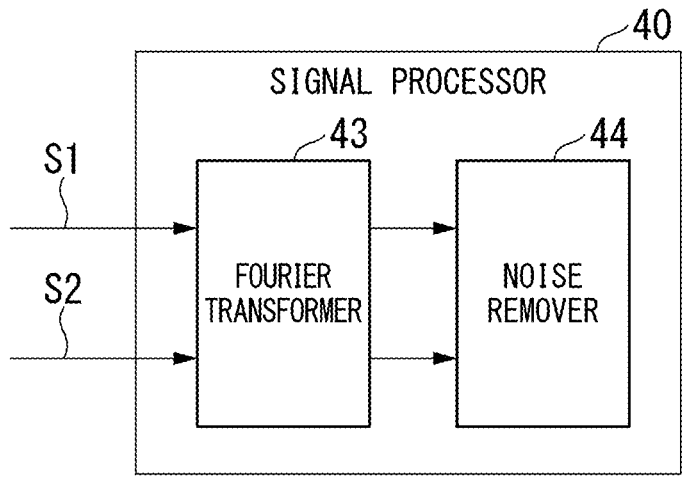
FIG. 6 is a block diagram illustrating a second example of the signal processor which is provided in the Fourier spectroscopic analyzer according to the first embodiment of the invention.

FIG. 6 is a block diagram illustrating a second example of the signal processor which is provided in the Fourier spectroscopic analyzer according to the first embodiment of the invention. As illustrated in FIG. 6, the signal processor 40 according to this example includes a Fourier transformer 43 that receives light-reception signals S1 and S2 and a noise remover 44 that receives an output signal of the Fourier transformer 43.

The Fourier transformer 43 calculates a spectrum of the light-reception signal S1 (also referred to as a first spectrum) and a spectrum of the light-reception signal S2 (also referred to as a second spectrum) by individually performing a Fourier transform process on the light-reception signal S1 and the light-reception signal S2. Since noise due to a change with time in optical characteristics of the sample SP is superimposed on the light-reception signals S1 and S2 in the same way, noise due to a change with time in optical characteristics of the sample SP is superimposed in the spectra of the light-reception signals S1 and S2 calculated by the Fourier transformer 43.

The noise remover 44 performs a process of removing the noise superimposed on the spectrum of the light-reception signal S1 using the spectrum of the light-reception signal S2. For example, the noise remover 44 removes the noise superimposed on the spectrum of the light-reception signal S1 by performing a process of subtracting the spectrum of the light-reception signal S2 from the spectrum of the light-reception signal S1. As long as the noise superimposed on the spectrum of the light-reception signal S1 can be removed, the process performed by the noise remover 44 may be an arbitrary process and is not limited to the process of subtracting the spectrum of the light-reception signal S2 from the spectrum of the light-reception signal S1.

In the signal processor 40 illustrated in FIG. 6, the Fourier transformer 43 acquires the spectra of the light-reception signals S1 and S2 and the noise remover 44 performs the process of removing the noise superimposed on the spectrum of the light-reception signal S1. However, the Fourier transformer 43 may perform only the Fourier transform process on the light-reception signals S1 and S2 and the noise remover 44 may calculate the spectrum of the light-reception signal S1 after performing a noise removing process on a Fourier transform signal which is a complex signal of the light-reception signal S1.

Specifically, the Fourier transformer 43 calculates a Fourier transform signal which is a complex signal of the light-reception signal S1 and a Fourier transform signal which is a complex signal of the light-reception signal S2 by individually performing the Fourier transform process on the light-reception signal S1 and the light-reception signal S2. Then, the noise remover 44 performs the process of removing noise from the Fourier transform signal of the light-reception signal S1 by performing a vector operation on the Fourier transform signal of the light-reception signal S1 and the Fourier transform signal of the light-reception signal S2. Finally, the spectrum of the light-reception signal S1 is calculated from the Fourier transform signal of the light-reception signal S1 from which noise has been removed. As a result, since noise is removed in consideration of a phase of noise, it is possible to realize higher analysis accuracy.

<Operation of Fourier Spectroscopic Analyzer>

An operation of the Fourier spectroscopic analyzer having the aforementioned embodiment will be described below. In the following description, for the purpose of easy understanding, it is assumed that the signal processor 40 provided in the Fourier spectroscopic analyzer 1 is the signal processor 40 illustrated in FIG. 6. When the signal processor 40 provided in the Fourier spectroscopic analyzer 1 is the signal processor 40 illustrated in FIG. 5, the process which is performed by the signal processor 40 differs but the same result, that is, the same spectrum, as the signal processor 40 illustrated in FIG. 6 can be obtained.

When light L0 including a plurality of wavelength components is emitted from the light source 10, the light L0 is incident on the interferometer 20. The light L0 incident on the interferometer 20 is divided into divided light L11 traveling to the fixed mirror 22 and divided light L12 traveling to the mobile mirror 23 by the half mirror 21. The divided light L11 divided by the half mirror 21 is reflected by the fixed mirror 22, travels reversely along an optical path extending from the half mirror 21 to the fixed mirror 22, and is incident on the half mirror 21. The divided light L12 divided by the half mirror 21 is reflected by the mobile mirror 23, travels reversely along an optical path extending from the half mirror 21 to the mobile mirror 23, and is incident on the half mirror 21. When the divided light L11 and L12 is incident on the half mirror 21, they interfere with each other and thus an interferogram L1 is acquired.

Since the mobile mirror 23 provided in the interferometer 20 reciprocates, wavelength components included in the light L0 emitted from the light source 10 are intensity-modulated at different frequencies. For example, a wavelength component with a relatively small wavelength is intensity-modulated at a higher frequency than a wavelength component with a relatively large wavelength. The interferogram L1 in which the wavelength components intensity-modulated at different frequencies are superimposed is acquired by the interferometer 20.

The interferogram L1 acquired by the interferometer 20 is applied to the sample SP and transmitted light transmitted by the sample SP is incident as light L2 on the light receiver 30. When optical characteristics of the sample SP changes with time, the light L2 passing through the sample SP is subjected to modulation corresponding to a change with time in optical characteristics of the sample SP. Accordingly, noise including many low-frequency components, so-called "coloring noise," is superimposed on the light L2 passing through the sample SP. It should be noted that all the wavelength components included in the light L2 passing through the sample SP are modulated in the same way due to a change with time in optical characteristics of the sample SP and thus the same noise is superimposed on all the wavelength components included in the light L2 passing through the sample SP.

Figure 7A:
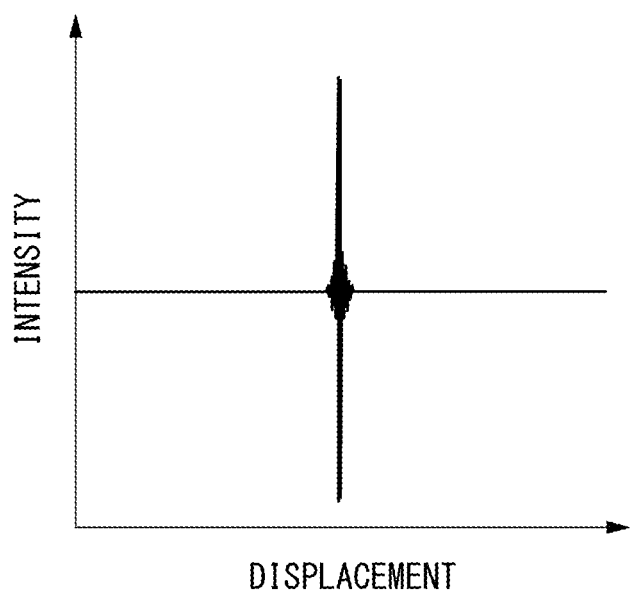
FIG. 7A is a diagram illustrating an example of an interferogram when optical characteristics of a sample SP do not change with time in the first embodiment of the invention.
Figure 7B:
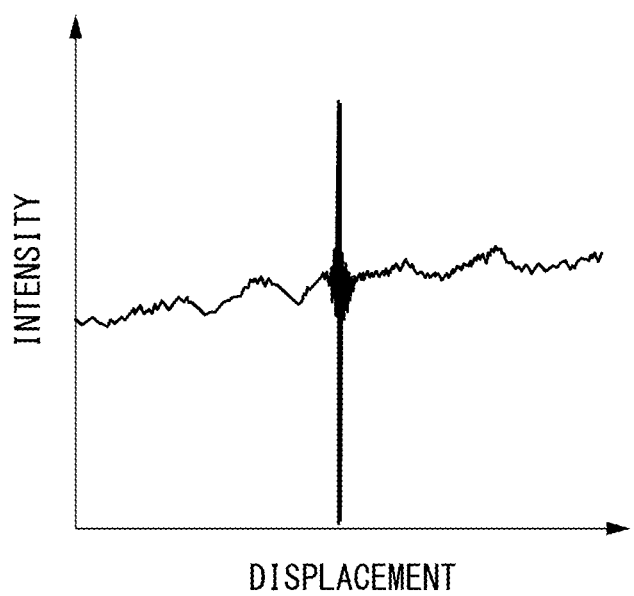
FIG. 7B is a diagram illustrating an example of an interferogram when optical characteristics of a sample SP change with time in the first embodiment of the invention.
Figure 7C:
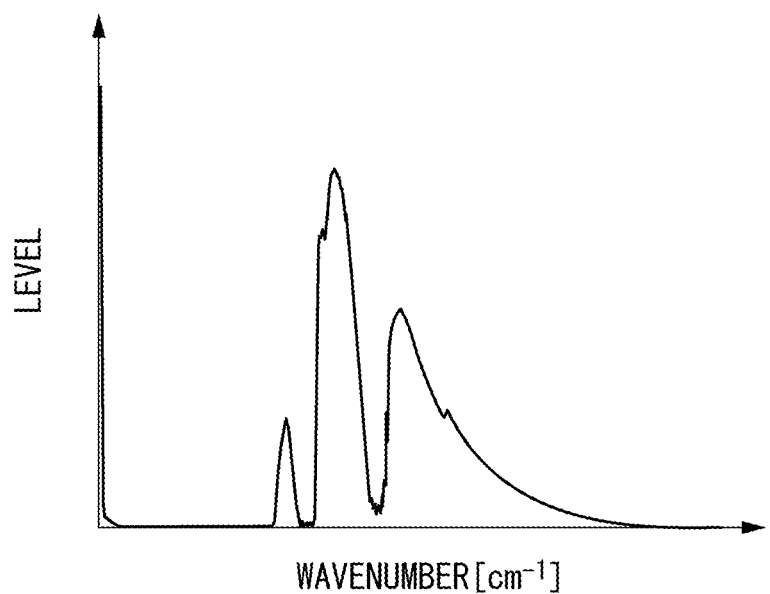
FIG. 7C is a diagram illustrating a wavenumber spectrum of the interferogram illustrated in FIG. 7A.
Figure 7D:
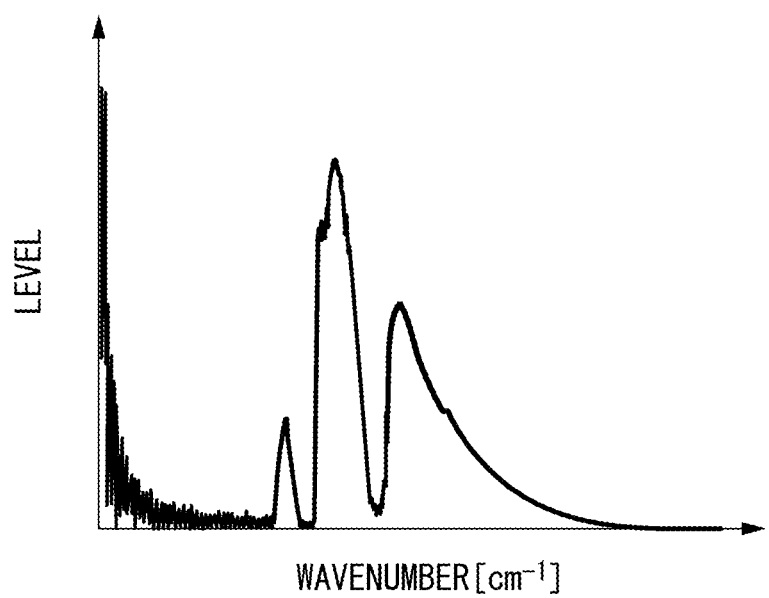
FIG. 7D is a diagram illustrating a wavenumber spectrum of the interferogram illustrated in FIG. 7B.

FIGS. 7A to 7D are diagrams illustrating an example of an interferogram passing through a sample according to the first embodiment of the invention. FIG. 7A illustrates an interferogram when the optical characteristics of the sample SP do not change with time. FIG. 7B illustrates an interferogram when the optical characteristics of the sample SP change with time. FIGS. 7A and 7B, a displacement of the mobile mirror 23 of the interferometer 20 is taken as the horizontal axis, and an intensity of an interferogram is taken as the vertical axis. FIG. 7C is a diagram illustrating a spectrum, that is, a wavenumber spectrum of the interferogram illustrated in FIG. 7A. FIG. 7D is a diagram illustrating a spectrum, that is, a wavenumber spectrum of the interferogram illustrated in FIG. 7B.

An interferogram passing through a sample SP of which optical characteristics do not change with time has a typical shape in which so-called center burst occurs as illustrated in FIG. 7A. That is, the intensity is maximized when the displacement of the mobile mirror 23 is a specific displacement which is a displacement at which an optical path difference between the divided light L11 and L12 is zero, and the intensity decreases extremely, that is, becomes almost zero, in the other displacements. A wavenumber spectrum of an interferogram passing through a sample SP of which optical characteristics do not change with time has a shape based on the optical characteristics, that is, absorption characteristics, of the sample SP as illustrated in FIG. 7C and has a smooth shape in which noise is not superimposed.

On the other hand, as illustrated in FIG. 7B, an interferogram passing through a sample SP of which optical characteristics change with time is the same as the interferogram illustrated in FIG. 7A in that so-called center burst occurs. However, when the displacement of the mobile mirror 23 is a displacement other than the specific displacement, the intensity does not become almost zero but changes due to a change with time in optical characteristics of the sample SP. Noise is superimposed on the wavenumber spectrum of the interferogram passing through the sample SP of which optical characteristics change with time as illustrated in FIG. 7D. For example, noise including many components with a small wavenumber, that is, low-frequency components, that is, "coloring noise," is superimposed on the wavenumber spectrum of the interferogram passing through the sample SP of which optical characteristics change with time.

In the light L2 incident on the light receiver 30, a wavelength component in the first wavelength band is received by the detector 31 and the light-reception signal S1 is output from the detector 31. In the light L2 incident on the light receiver 30, a wavelength component in the second wavelength band is received by the detector 32 and the light-reception signal S2 is output from the detector 32. The light-reception signal S1 output from the detector 31 and the light-reception signal S2 output from the detector 32 are input to the signal processor 40 illustrated in FIG. 6.

When the light-reception signals S1 and S2 are input to the signal processor 40, the Fourier transformer 43 performs a process of calculating the spectrum of the light-reception signal S1 and the spectrum of the light-reception signal S2 by individually performing the Fourier transform process on the light-reception signal S1 and the light-reception signal S2. The spectra calculated by the Fourier transformer 43, that is, the spectrum of the light-reception signal S1 and the spectrum of the light-reception signal S2 are output to the noise remover 44 and the process of removing noise superimposed on the spectrum of the light-reception signal S1 using the spectrum of the light-reception signal S2 is performed. For example, the process of subtracting the spectrum of the light-reception signal S2 from the spectrum of the light-reception signal S1 is performed by the noise remover 44. By performing this process, a spectrum in which noise due to a change with time in optical characteristics of the sample SP has been removed, that is, a spectrum of a wavelength component in the first wavelength band, is calculated.

Figure 8A:
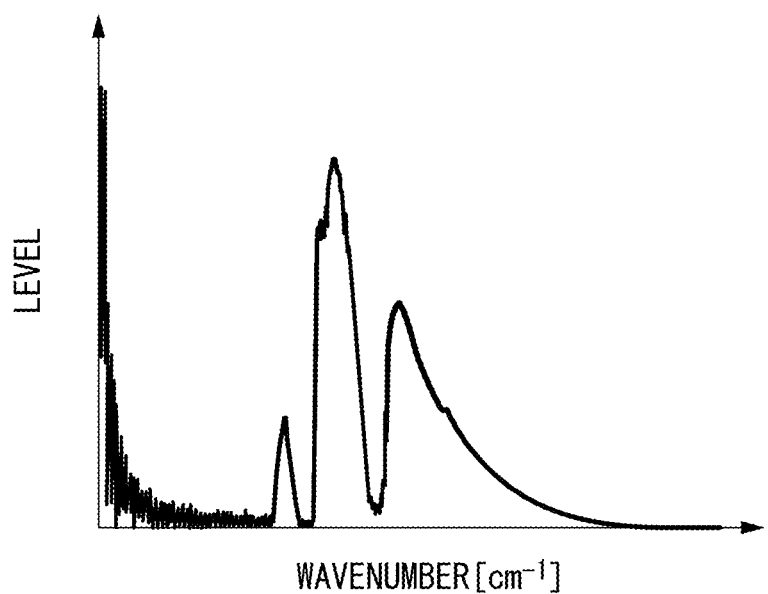
FIG. 8A is a diagram illustrating an example of a spectrum of a light-reception signal in the first embodiment of the invention.
Figure 8B:
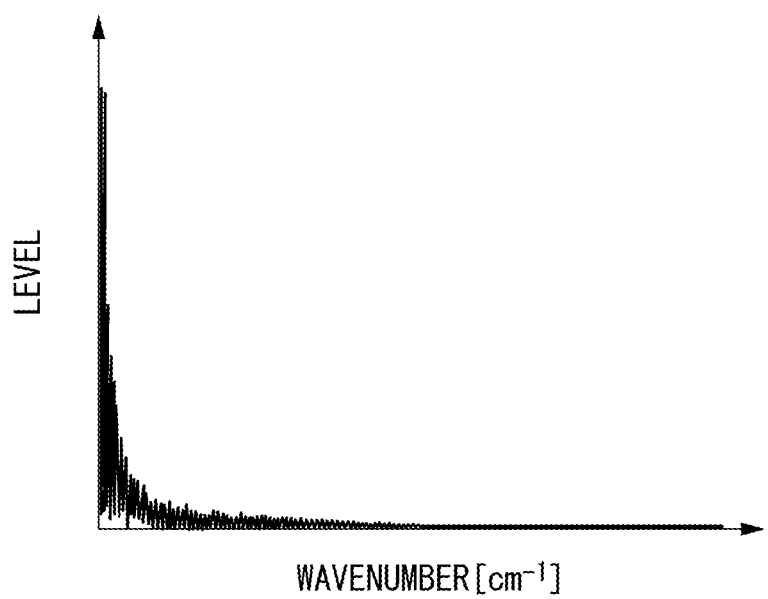
FIG. 8B is a diagram illustrating an example of a spectrum of another light-reception signal in the first embodiment of the invention.
Figure 8C:
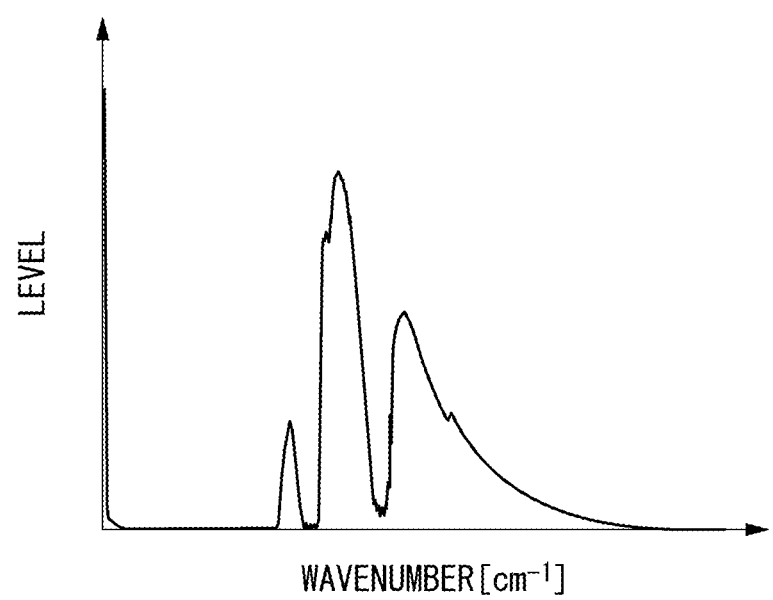
FIG. 8C is a diagram illustrating an example of a spectrum in which noise due to a change with time in optical characteristics of a sample has been removed in the first embodiment of the invention.

FIGS. 8A to 8C are diagrams illustrating the principle that noise is removed in the first embodiment of the invention. FIG. 8A is a diagram illustrating an example of the spectrum of the light-reception signal S1. FIG. 8B is a diagram illustrating an example of the spectrum of the light-reception signal S2. The light-reception signal S1 output from the detector 31 is a signal which is acquired by receiving a wavelength component included in the first wavelength band, and noise due to a change with time in optical characteristics of the sample SP is superimposed on the light-reception signal S1. Accordingly, the spectrum of the light-reception signal S1 calculated by the Fourier transformer 43 has a shape corresponding to absorption characteristics which are optical characteristics of the sample SP as illustrated in FIG. 8A. Noise due to a change with time in optical characteristics of the sample SP is superimposed on the spectrum of the light-reception signal S1 calculated by the Fourier transformer 43.

On the other hand, the light-reception signal S2 output from the detector 32 is a signal which is acquired by receiving a wavelength component included in the second wavelength band which is different from the first wavelength band, and the same noise as the noise superimposed on the light-reception signal S1 is superimposed on the light-reception signal S2. Accordingly, the spectrum of the light-reception signal S2 calculated by the Fourier transformer 43 represents the spectrum of the noise due to a change with time in optical characteristics of the sample SP as illustrated in FIG. 8B. The reason the spectrum of the light-reception signal S2 becomes such a spectrum is that all the wavelength components included in light L2 passing through the sample SP are modulated in the same way according to a change with time in optical characteristics of the sample SP and thus the same noise is superimposed on all the wavelength components included in the light L2 passing through the sample SP.

Accordingly, for example, the noise remover 44 performs a process of subtracting the spectrum of the light-reception signal S2 illustrated in FIG. 8B from the spectrum of the light-reception signal S1 illustrated in FIG. 8A, and thus the spectrum from which noise due to a change with time in optical characteristics of the sample SP is removed, that is, the spectrum of the wavelength component in the first wavelength band, is calculated as illustrated in FIG. 8C. Noise due to a change with time in optical characteristics of the sample SP is removed in this principle.

As described above, according to the first embodiment, a sample SP is irradiated with an interferogram L1 acquired by the interferometer 20, a light-reception signal S1 is acquired by receiving a wavelength component in a first wavelength band which is a wavelength band in which a spectrum is calculated out of wavelength components included in light L2 passing through the sample SP, a light-reception signal S2 is acquired by receiving a wavelength component in a second wavelength band different from the first wavelength, and a spectrum of the wavelength component in the first wavelength with removed noise is calculated using the light-reception signals S1 and S2. In this way, according to the first embodiment, since noise due to a change with time in optical characteristics of a sample SP is removed, it is possible to realize high analysis accuracy even if the optical characteristics of the sample SP change with time.

Second Embodiment

Figure 9:
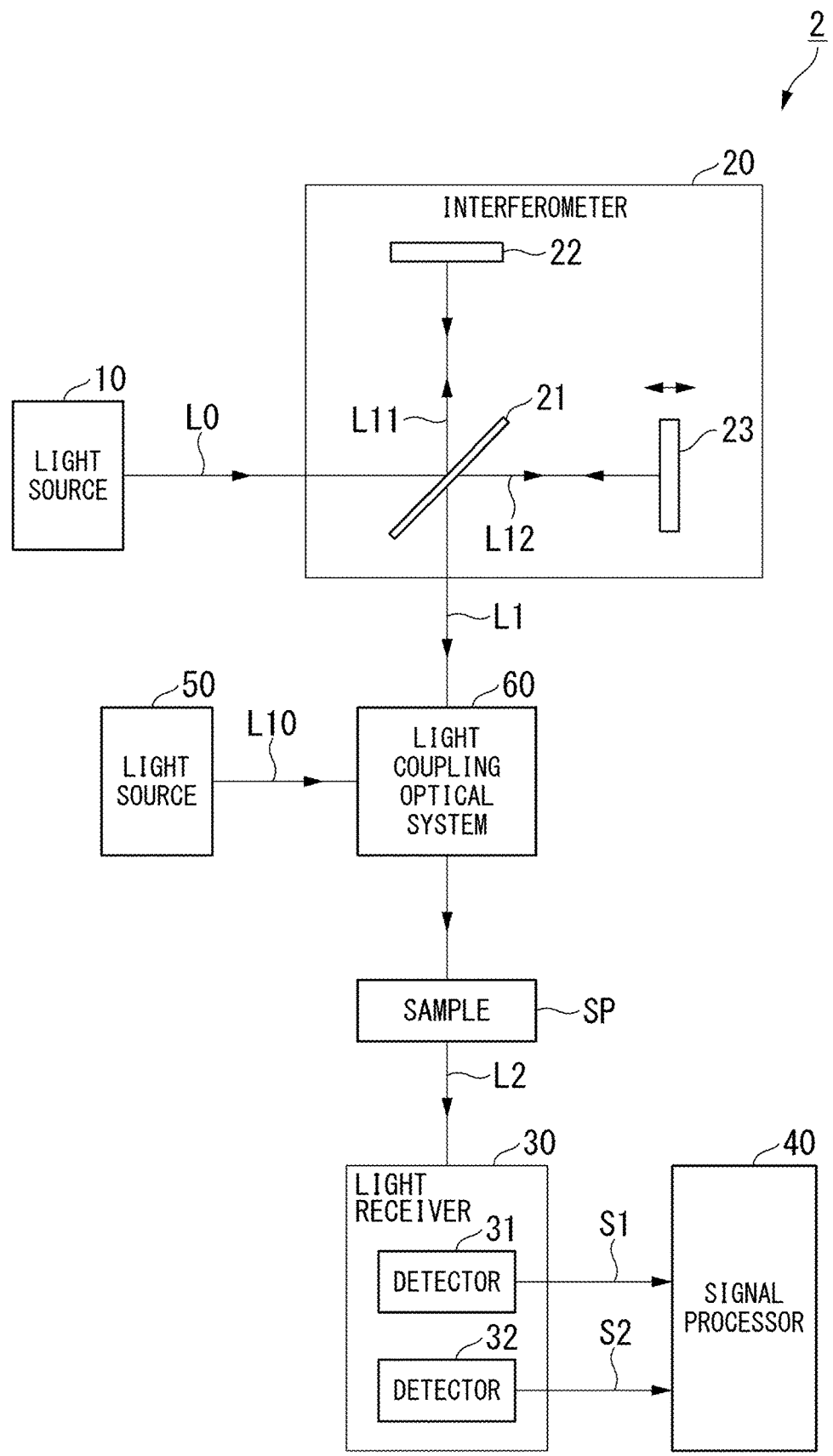
FIG. 9 is a block diagram illustrating a principal configuration of a Fourier spectroscopic analyzer according to a second embodiment of the invention.

FIG. 9 is a block diagram illustrating a principal configuration of a Fourier spectroscopic analyzer according to a second embodiment of the invention. As illustrated in FIG. 9, the Fourier spectroscopic analyzer 2 according to the second embodiment has a configuration in which a light source 50 (also referred to as a second light source) and a light coupling optical system 60 are added to the Fourier spectroscopic analyzer 1 illustrated in FIG. 1. In the Fourier spectroscopic analyzer 2 having this configuration, it is possible to achieve improvement in analysis accuracy by compensating for a deficient quantity of light in a second wavelength band, that is, by supplementing wavelength components in the second wavelength band.

An energy density of a halogen lamp in a wavelength band on a short wavelength side, that is, a wavelength band included in the second wavelength band, tends to decrease. Accordingly, when a halogen lamp is used as the light source 10, a likelihood that an S/N ratio, that is, a signal-to-noise ratio, of a light-reception signal S2 which is acquired by receiving a wavelength component included in the second wavelength band and which is output from the detector 32 will decrease and analysis accuracy will decrease is conceivable. When a halogen lamp is used as the light source 10 of the Fourier spectroscopic analyzer 2 according to the second embodiment, it is possible to achieve improvement in analysis accuracy by compensating for a deficient quantity of light in the second wavelength band using the light source 50 to improve the S/N ratio of the light-reception signal S2.

The light source 50 is a light source that is provided to compensate for a deficient quantity of light in the second wavelength band. For example, a light source including a semiconductor light-emitting element such as an LD or an LED can be used as the light source 50. At least a part of a wavelength band of light L10 emitted from the light source 50 has only to be included in the second wavelength band. Here, the wavelength band of the light L10 emitted from the light source 50 has to improve the S/N ratio of the light-reception signal S2 output from the detector 32. Accordingly, the wavelength band needs to be a wavelength band in which a quantity of light received by the detector 32 is increased. For example, an LED using GaAs (gallium arsenide) as a major material and emitting light L10 in a wavelength band of about 0.6 [μm] to 1 [μm] can be used as the light source 50.

The light coupling optical system 60 is provided between the interferometer 20 and the sample SP and couples light emitted from the interferometer 20, that is, an interferogram L1 acquired by the interferometer 20, to the light L10 emitted from the light source 50. Light coupled by the light coupling optical system 60 is applied to the sample SP. For example, an optical system in which optical elements such as a half mirror and a mirror are combined or a light coupler can be used as the light coupling optical system 60.

In the second embodiment, the interferogram L1 acquired by the interferometer 20 is coupled to the light L10 emitted from the light source 50 by the light coupling optical system 60. The intensity of the light L10 emitted from the light source 50 does not change with time or hardly changes. Accordingly, a signal intensity of the light-reception signal S2 output from the detector 32 is increased by the intensity of the light L10 emitted from the light source 50. Accordingly, the S/N ratio of the light-reception signal S2 is improved. As a result, with the Fourier spectroscopic analyzer 2 according to the second embodiment, it is possible to achieve improvement in analysis accuracy even when a halogen lamp is used as the light source 10.

Third Embodiment

Figure 10:
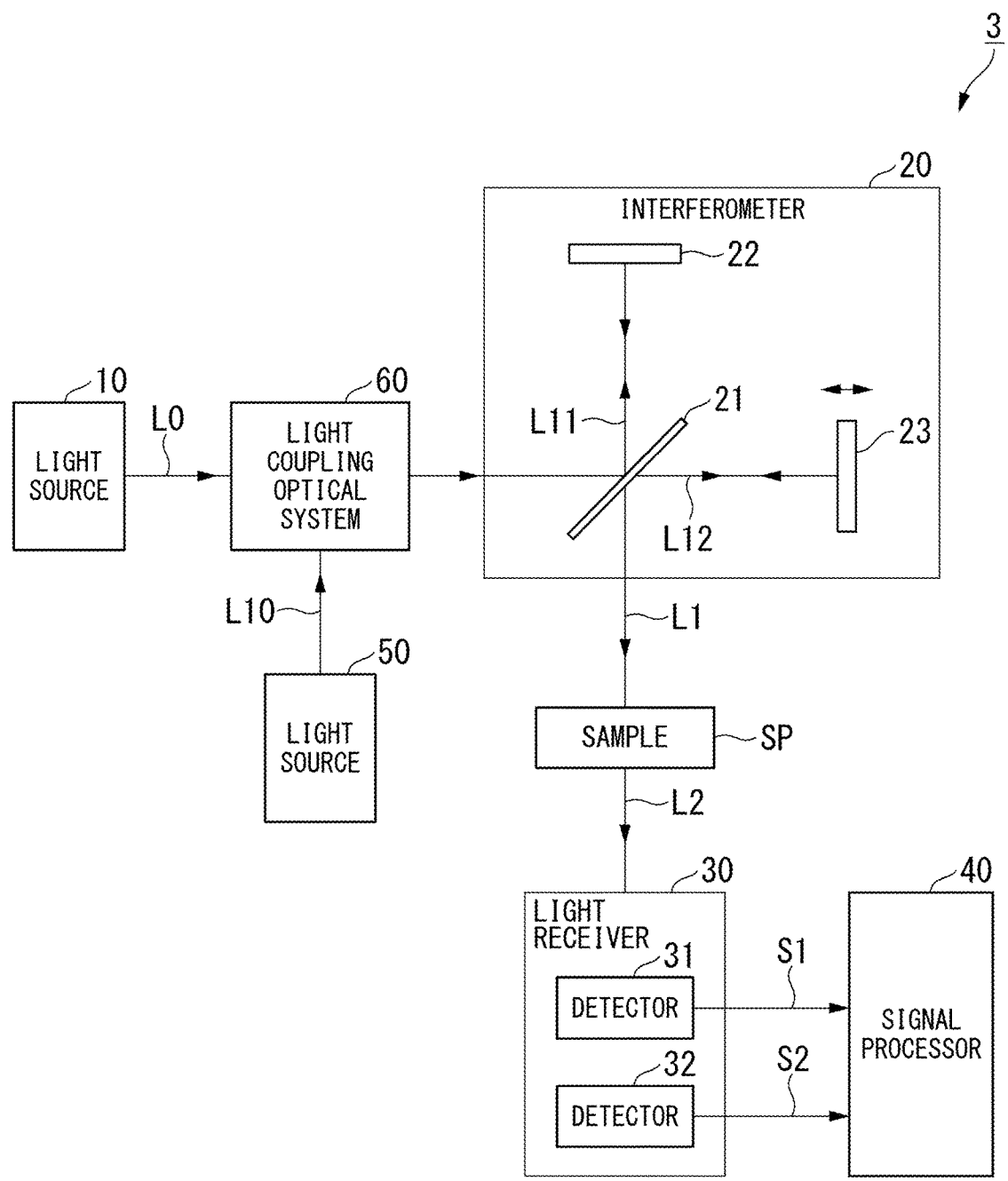
FIG. 10 is a block diagram illustrating a principal configuration of a Fourier spectroscopic analyzer according to a third embodiment of the invention.

FIG. 10 is a block diagram illustrating a principal configuration of a Fourier spectroscopic analyzer according to a third embodiment of the invention. As illustrated in FIG. 10, the Fourier spectroscopic analyzer 3 according to the third embodiment has a configuration in which a light source 50 and a light coupling optical system 60 are added to the Fourier spectroscopic analyzer 1 illustrated in FIG. 1 similarly to the Fourier spectroscopic analyzer 2 illustrated in FIG. 9. With the Fourier spectroscopic analyzer 3 according to the third embodiment, similarly to the Fourier spectroscopic analyzer 2 illustrated in FIG. 9, it is also possible to achieve improvement in analysis accuracy by compensating for a deficient quantity of light in a second wavelength band.

The light source 50 and the light coupling optical system 60 illustrated in FIG. 10 are the same as the light source 50 and the light coupling optical system 60 illustrated in FIG. 9. In the Fourier spectroscopic analyzer 2 illustrated in FIG. 9, the light coupling optical system 60 is provided between the interferometer 20 and the sample SP. On the other hand, in the Fourier spectroscopic analyzer 3 according to the third embodiment, the light coupling optical system 60 is provided between the light source 10 and the interferometer 20.

In the third embodiment, light L0 emitted from the light source 10 is coupled to light L10 emitted from the light source 50 by the light coupling optical system 60 and then the resultant light is incident on the interferometer 20. That is, a quantity of light in the second wavelength band of the light L0 emitted from the light source 10 is supplemented by the light L10 emitted from the light source 50 and then is incident to the interferometer 20. Since the quantity of light in the second wavelength band of light which is incident on the interferometer 20 is supplemented, a quantity of light in the second wavelength band of an interferogram L1 acquired by the interferometer 20 is also supplemented.

In the third embodiment, similarly to the second embodiment, the intensity of the light L10 emitted from the light source 50 does not change with time or hardly changes. Accordingly, a signal intensity of the light-reception signal S2 output from the detector 32 is increased by the intensity of the light L10 emitted from the light source 50, the S/N ratio of the light-reception signal S2 is improved. Accordingly, with the Fourier spectroscopic analyzer 3 according to the third embodiment, it is possible to achieve improvement in analysis accuracy even when a halogen lamp is used as the light source 10.

While the Fourier spectroscopic analyzers according to the first to third embodiments of the invention have been described above, the invention is not limited to the embodiments and can be freely modified within the scope of the invention. For example, in the aforementioned embodiments, the signal processor 40 immediately performs processing using the light-reception signals S1 and S2 output from the detectors 31 and 32. However, the light-reception signals S1 and S2 output from the detectors 31 and 32 may be stored in a memory and the signal processor 40 may perform the processing later.

In the aforementioned embodiments, it has been assumed above that the first wavelength band ranges from about 1 [µm] to 2.5 [µm] and the second wavelength band ranges from about 0.5 [µm] to 1 [µm], that is, that the second wavelength band is closer to the short wavelength side than the first wavelength band. However, the second wavelength band may be closer to a long wavelength side than the second wavelength band. When the second wavelength band is closer to the long wavelength side than the first wavelength band, a light source that can supplement a quantity of light in the second wavelength band which is closer to the long wavelength side than the first wavelength band can be used as the light source 50 in the Fourier spectroscopic analyzers 2 and 3 according to the second and third embodiments.

In the second embodiment, an example in which the light L10 emitted from the light source 50 is coupled to the interferogram L1 acquired by the interferometer 20 has been described. In the third embodiment, an example in which the light L10 emitted from the light source 50 is coupled to the light L0 emitted from the light source 10 has been described. When a quantity of light in the second wavelength band is deficient, the second embodiment and the third embodiment may be combined. That is, two light sources 50 may be provided, light L10 emitted from one light source 50 may be coupled to light L0 emitted from the light source 10, and light L10 emitted from the other light source 50 may be coupled to an interferogram L1 acquired by the interferometer 20.

EXAMPLES

Figure 11:
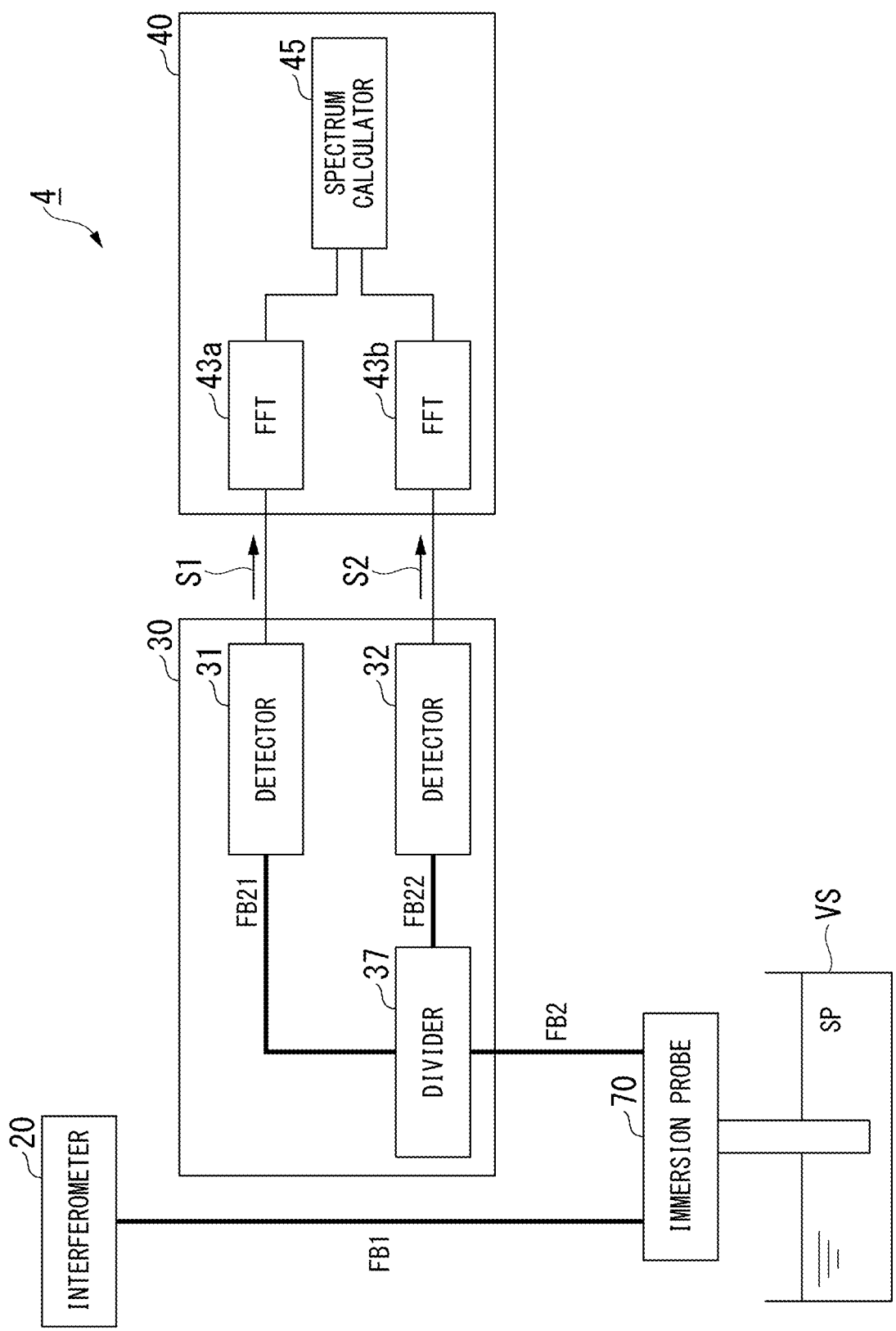
FIG. 11 is a block diagram illustrating a principal configuration of a Fourier spectroscopic analyzer according to an example.

The inventor of the present application actually manufactured the Fourier spectroscopic analyzer according to the first embodiment and evaluated characteristics thereof. FIG. 11 is a block diagram illustrating a principal configuration of a Fourier spectroscopic analyzer according to an example. In FIG. 11, elements corresponding to the elements illustrated in FIG. 1 will be referred to by the same reference signs. In FIG. 11, the light source 10 in FIG. 1 is not illustrated. For example, a halogen lamp having a wavelength band width of about 350 [nm] to 4500 [nm] was used as the light source 10.

As illustrated in FIG. 11, the Fourier spectroscopic analyzer 4 according to this example includes an immersion probe 70 in addition to a light source 10 which is not illustrated, an interferometer 20, a light receiver 30, and a signal processor 40. A tip of the immersion probe 70 is immersed in a sample SP such that an interferogram L1 acquired by the interferometer 20 is guided to the sample SP and light L2 passing through the sample SP is guided to the light receiver 30.

The interferometer 20 and the immersion probe 70 are connected to each other via an optical fiber FB1. The immersion probe 70 and the light receiver 30 are connected to each other via an optical fiber FB2. Accordingly, the interferogram L1 acquired by the interferometer 20 is guided to the immersion probe 70 via the optical fiber FB1. The interferogram L1 guided to the immersion probe 70 is guided into the sample SP by the immersion probe 70. Light guided into the sample SP by the immersion probe 70, that is, light L2 passing through the sample SP, is guided to the light receiver 30 via the optical fiber FB2.

The light receiver 30 includes a divider 37 in addition to detectors 31 and 32. The divider 37 includes one input terminal and two output terminals. The light receiver 30 divides light input from the input terminal into two light components at an intensity ratio of 1:1 and outputs the divided light components from the two output terminals. The divider 37 may divide light input from the input terminal at an intensity ratio other than 1:1. The divider 37 has the same function as the half mirror 34 illustrated in FIG. 3A.

The optical fiber FB2 is connected to the input terminal of the divider 37. Ends of optical fibers FB21 and FB22 are connected to the two output terminals of the divider 37. The other end of the optical fiber FB21 is connected to the detector 31. The other end of the optical fiber FB22 is connected to the detector 32. Accordingly, light guided from the immersion probe 70 to the light receiver 30 via the optical fiber FB2 is divided into two light components by the divider 37. One of the divided light components is guided to the detector 31 by the optical fiber FB21. The other of the divided light components is guided to the detector 32 by the optical fiber FB22.

An InGaAs photo diode with a high detection sensitivity to light in a wavelength band of about 1 [µm] to 2.5 [µm] is used as the detector 31. An InGaAs photo diode with a high detection sensitivity to light in a wavelength band of about 500 [nm] to 1.7 [µm] is used as the detector 32.

The signal processor 40 includes Fourier transformers 43a and 43b and a spectrum calculator 45. The Fourier transformers 43a and 43b individually perform a Fourier transform process on a light-reception signal S1 output from the detector 31 and a light-reception signal S2 output from the detector 32. Accordingly, a Fourier transform signal which is a complex signal of the light-reception signal S1 and a Fourier transform signal which is a complex signal of the light-reception signal S2 are acquired.

The spectrum calculator 45 performs a process of removing noise from the Fourier transform signal of the light-reception signal S1 by performing a vector operation of the Fourier transform signal of the light-reception signal S1 acquired by the Fourier transformer 43a and the Fourier transform signal of the light-reception signal S2 acquired by the Fourier transformer 43b. In this example, in order to achieve higher analysis accuracy, noise is removed through the vector operation in consideration of a phase of noise. The spectrum calculator 45 calculates a spectrum of the light-reception signal S1 from the Fourier transform signal of the light-reception signal S1 from which noise has been removed.

In this example, a sample SP in which potato starch was dispersed in water to simulate a cell culture solution was used. Specifically, a sample SP in which 5 [g] to 10 [g] of potato starch was dispersed in $1.5 \times 10^{-3}$ [m$^{-3}$], that is, 1.5 liter, of water was used. This sample SP was contained in a vessel VS, a surrounding temperature of the vessel VS was maintained at room temperature, and measurement was performed using the Fourier spectroscopic analyzer 1 illustrated in FIG. 11 while agitating the sample SP at an agitation speed of 80 [rpm] to 160 [rpm].

Figure 12:
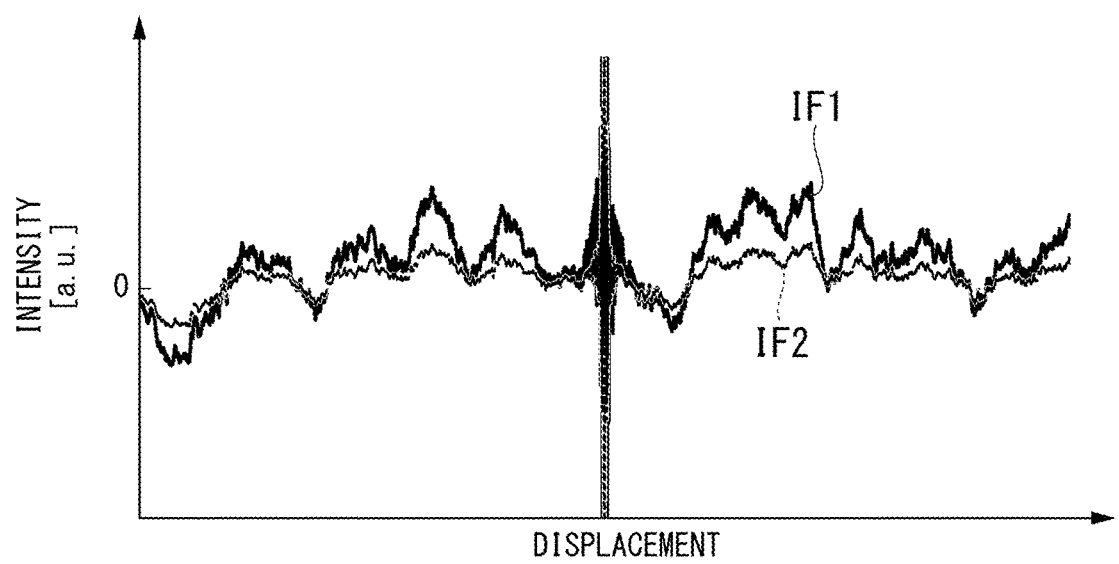
FIG. 12 is a diagram illustrating a measurement result of an interferogram passing through a sample in the example.

FIG. 12 is a diagram illustrating a result of measurement of an interferogram passing through a sample according to the example. In FIG. 12, similarly to FIGS. 7A and 7B, a displacement of the mobile mirror 23 provided in the interferometer 20 and illustrated in FIG. 1 is taken as the horizontal axis, and an intensity of an interferogram is taken as the vertical axis. The vertical axis in FIG. 12 is enlarged to five times the vertical axis illustrated in FIGS. 7A and 7B in consideration of visibility. That is, the scale of the vertical axis is set to five times.

An interferogram IF1 illustrated in FIG. 12 is acquired from a light-reception signal S1 output from the detector 31. An interferogram IF2 is acquired from a light-reception signal S2 output from the detector 32. Referring to FIG. 12, intensities of both the interferograms IF1 and IF2 hardly become zero but change due to a change with time of optical characteristics of the sample SP similarly to the interferogram illustrated in FIG. 7B.

Figure 13A:
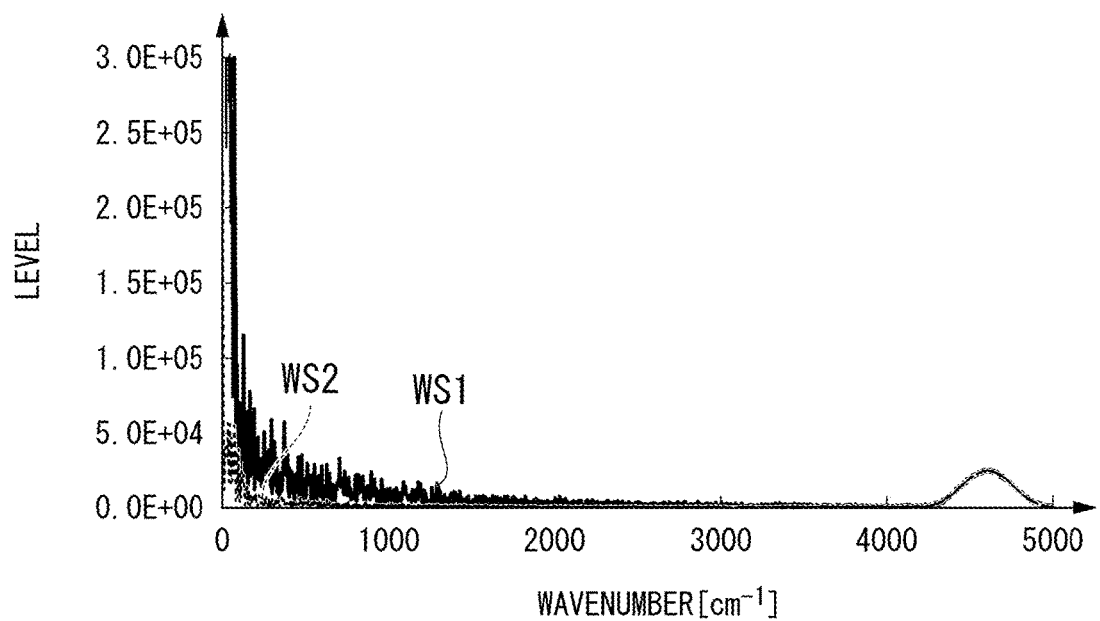
FIG. 13A is a diagram illustrating a wavenumber spectrum in a wavenumber range of 0 [$cm^{-1}$] to 5000 [$cm^{-1}$].
Figure 13B:
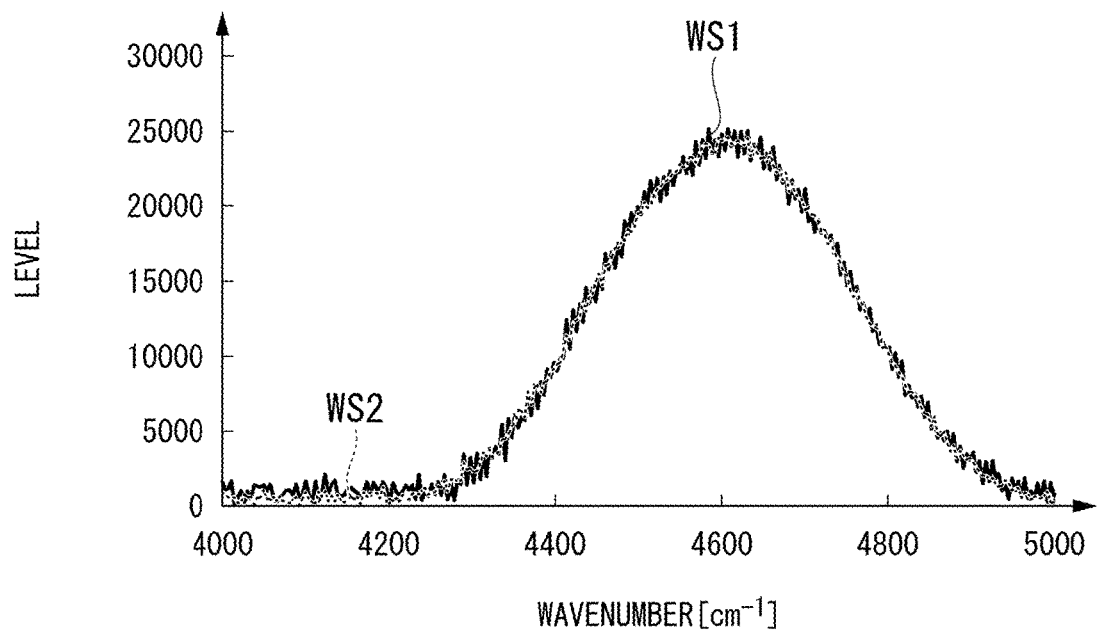
FIG. 13B is a diagram illustrating a wavenumber spectrum in a wavenumber range of 4000 [$cm^{-1}$] to 5000 [$cm^{-1}$].

FIGS. 13A and 13B are diagrams illustrating spectra, that is, wavenumber spectra, of the interferograms illustrated in FIG. 12. FIG. 13A is a diagram illustrating a wavenumber spectrum in wavenumber range of 0 [cm$^{-1}$] to 5000 [cm$^{-1}$]. FIG. 13B is an enlarged diagram illustrating a wavenumber spectrum in wavenumber range of 4000 [cm$^{-1}$] to 5000 [cm$^{-1}$]. In this example, the wavenumber range of 4000 [cm$^{-1}$] to 5000 [cm$^{-1}$] which is enlarged in FIG. 13B is an analysis target range, that is, a wavelength band which is an analysis target.

The wavenumber spectrum WS1 illustrated in FIGS. 13A and 13B is acquired by performing a Fourier transform process on the interferogram IF1 illustrated in FIG. 12, that is, the light-reception signal S1. That is, the wavenumber spectrum WS1 illustrated in FIGS. 13A and 13B has not been subjected to removal of noise due to a change with time in optical characteristics of the sample SP. On the other hand, noise due to a change with time in optical characteristics of the sample SP has been removed from the wavenumber spectrum WS2 illustrated in FIGS. 13A and 13B.

The wavenumber spectrum WS2 is acquired by performing the following process. First, the Fourier transformers 43a and 43b illustrated in FIG. 11 individually perform a Fourier transform process on the interferograms IF1 and IF2 illustrated in FIG. 12, that is, the light-reception signals S1 and S2. Then, the spectrum calculator 45 illustrated in FIG. 11 performs a process of removing noise from the Fourier transform signal of the light-reception signal S1 by performing a vector operation of the Fourier transform signal which is a complex signal of the light-reception signal S1 and a Fourier transform signal which is a complex signal of the light-reception signal S2. Then, the spectrum calculator 45 calculates the spectrum of the light-reception signal S1 from the Fourier transform signal of the light-reception signal S1 from which noise has been removed.

Referring to FIGS. 13A and 13B, so-called "coloring noise" which is noise including many components with a small wavenumber, that is, low-frequency components, is superimposed on the wavenumber spectrum WS1. Accordingly, fine sawtooth shapes which appeared in the waveform of the wavenumber spectrum WS appear in the waveform of the wavenumber spectrum WS1. On the other hand, fine sawtooth shapes hardly appear in the waveform of the wavenumber spectrum WS2. Accordingly, it could be ascertained from the wavenumber spectrum WS2 that a spectrum of noise due to a change with time in optical characteristics of the sample SP was removed from the wavenumber spectrum WS1.

Figure 14A:
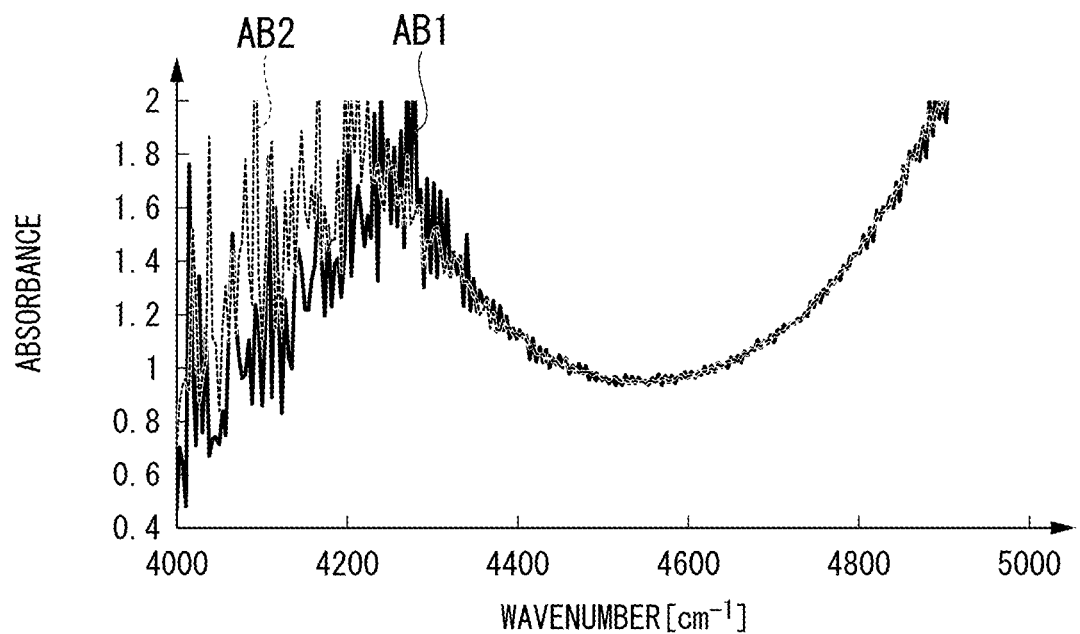
FIG. 14A is a diagram illustrating an absorbance spectrum in air in the example.
Figure 14B:
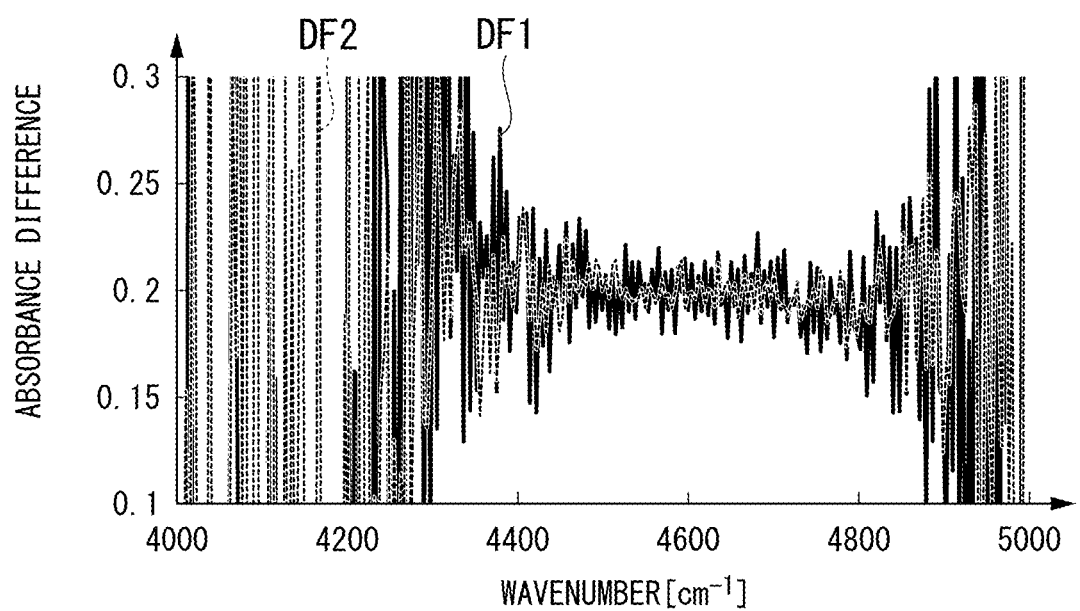
FIG. 14B is a diagram illustrating a difference spectrum indicating a difference between an absorbance spectrum illustrated in FIG. 14A in the example and an absorbance spectrum in water.

FIGS. 14A and 14B are diagrams illustrating a result of measurement of an absorbance spectrum in the example. FIG. 14A illustrates an absorbance spectrum in air. FIG. 14B illustrates a difference spectrum indicating a difference between the absorbance spectrum illustrated in FIG. 14A and an absorbance spectrum in water. FIGS. 14A and 14B illustrate only a wavelength band which is an analysis target, that is, a wavenumber range of 4000 [cm$^{-1}$] to 5000 [cm$^{-1}$].

The absorbance spectrum AB1 illustrated in FIG. 14A is calculated from the wavenumber spectrum WS1 illustrated in FIGS. 13A and 13B. The absorbance spectrum AB2 is calculated from the wavenumber spectrum WS2 illustrated in FIGS. 13A and 13B. The difference spectrum DF1 illustrated in FIG. 14B indicates a difference between the absorbance spectrum AB1 illustrated in FIG. 14A and the absorbance spectrum in water. The difference spectrum DF2 illustrated in FIG. 14B indicates a difference between the absorbance spectrum AB2 illustrated in FIG. 14A and the absorbance spectrum in water.

Figure 15:
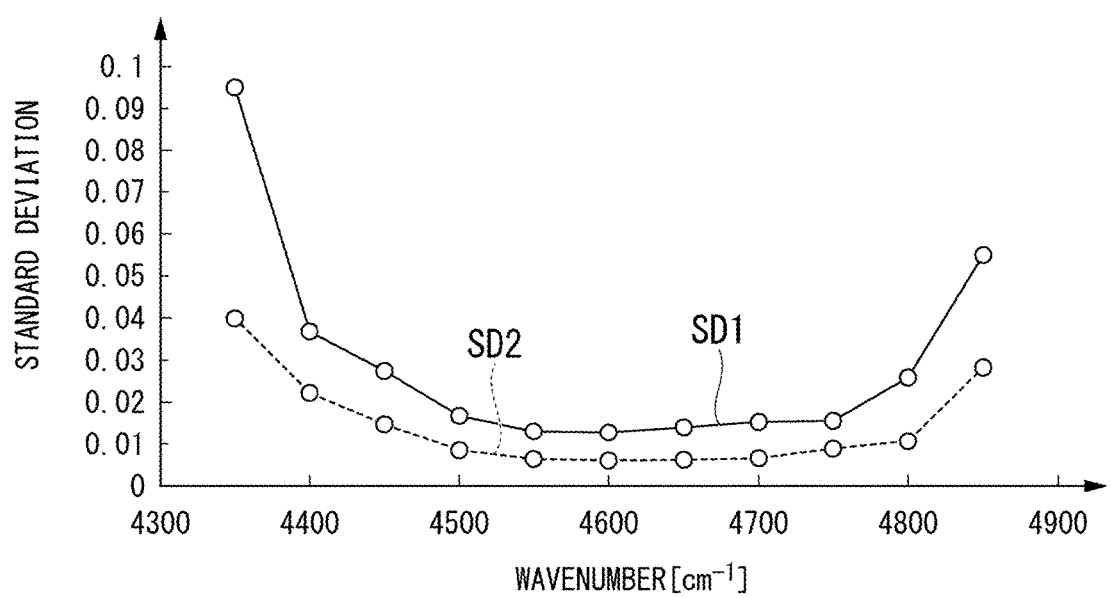
FIG. 15 is a diagram illustrating imbalance of the difference spectrum illustrated in FIG. 14B.

FIG. 15 is a diagram illustrating imbalance of the difference spectrum illustrated in FIG. 14B. In FIG. 15, a standard deviation every wavenumber 100 [cm$^{-1}$] is illustrated to quantify the imbalance of the difference spectrum illustrated in FIG. 14B. In FIG. 15, only a wavelength band in which the standard deviation is less than 0.1, that is, a wavenumber range of 4350 [cm$^{-1}$] to 4850 [cm$^{-1}$], in the wavenumber range of 4000 [cm$^-$] to 5000 [cm$^{-1}$], is illustrated.

The standard deviation SD1 illustrated in FIG. 15 represents the imbalance of the difference spectrum DF1 illustrated in FIG. 14B. The standard deviation SD2 represents the imbalance of the difference spectrum DF2 illustrated in FIG. 14B. Referring to FIG. 15, it can be seen that the standard deviation SD2 is about half the standard deviation SD1. That is, it can be ascertained that the imbalance of the difference spectrum DF2 illustrated in FIG. 14B is reduced to half the imbalance of the difference spectrum DF1 illustrated in FIG. 14B by removing the spectrum of noise due to a change with time in optical characteristics of the sample SP.

REFERENCE SIGNS LIST 1 to 4: Fourier spectroscopic analyzer
10: Light source
20: Interferometer
30: Light receiver
31, 32: Detector
33: Dichroic mirror
34: Half mirror
35, 36: Filter
40: Signal processor
50: Light source
60: Light coupling optical system
L1: Interferogram
L2: Light
L10: Light
S1, S2: Light-reception signal
SP: Sample
WB1: First wavelength band
WB2: Second wavelength band

The invention claimed is:

1. A Fourier spectroscopic analyzer comprising:
a first light source that emits light including a wavelength component in a first wavelength band which is a wavelength band in which a spectrum of light passing through a sample is acquired and a wavelength component in a second wavelength band different from the first wavelength band;
a second light source that emits light including the wavelength component in the second wavelength band;
an interferometer that acquires an interferogram which is coherent light from the light emitted from the first light source;
a first light coupling optical system that couples light emitted from the second light source to at least one of light emitted from the first light source and the interferogram acquired by the interferometer;
a light receiver that outputs a first light-reception signal acquired by receiving light including the wavelength component in the first wavelength band out of the wavelength components included in the light passing through the sample and a second light-reception signal acquired by receiving light including the wavelength component in the second wavelength band; and
a signal processor that performs a Fourier transform process on the first light-reception signal and the second light-reception signal to acquire a spectrum of the wavelength component in the first wavelength band with noise removed therefrom.

2. The Fourier spectroscopic analyzer according to claim 1, wherein the first light coupling optical system is provided between the interferometer and the sample and couples light emitted from the second light source to the interferogram acquired by the interferometer.

3. The Fourier spectroscopic analyzer according to claim 1, wherein the first light coupling optical system is provided between the first light source and the interferometer and couples light emitted from the second light source to light emitted from the first light source.

4. The Fourier spectroscopic analyzer according to claim 1, wherein the light receiver comprises:
a first detector configured to receive a wavelength component in a third wavelength band including the first wavelength band and the second wavelength band;
a second detector configured to receive the wavelength component in the third wavelength band; and
a divider configured to divide the light passing through the sample into the wavelength component in the first wavelength band which is incident on the first detector and the wavelength component in the second wavelength band which is incident on the second detector.

5. The Fourier spectroscopic analyzer according to claim 4, wherein the divider comprises a dichroic mirror that reflects the wavelength component in the first wavelength band and transmits the wavelength component in the second wavelength band.

6. The Fourier spectroscopic analyzer according to claim 4, wherein the divider comprises a dichroic mirror that transmits the wavelength component in the first wavelength band and reflects the wavelength component in the second wavelength band.

7. The Fourier spectroscopic analyzer according to claim 4, wherein the divider comprises:
a half mirror that divides the light passing through the sample into first light traveling to the first detector and second light traveling to the second detector;
a first filter that extracts the wavelength component in the first wavelength band from the wavelength component included in the first light and causes the extracted wavelength component to be incident on the first detector; and
a second filter that extracts the wavelength component in the second wavelength band from the wavelength component included in the second light and causes the extracted wavelength component to be incident on the second detector.

8. The Fourier spectroscopic analyzer according to claim 1, wherein the light receiver comprises:
- a first detector in which a detection sensitivity to the wavelength component in the first wavelength band is higher than that to the wavelength component in the second wavelength band; and
- a second detector in which a detection sensitivity to the wavelength component in the second wavelength band is higher than that to the wavelength component in the first wavelength band.

9. The Fourier spectroscopic analyzer according to claim 8, wherein the first detector and the second detector are sequentially disposed on an optical path of the light passing through the sample.

10. The Fourier spectroscopic analyzer according to claim 1, wherein the signal processor:
- individually performs the Fourier transform process on the first light-reception signal and the second light-reception signal to acquire a first Fourier transform signal for the first light-reception signal and a second Fourier transform signal for the second light-reception signal;
- removes noise from the first Fourier transform signal on the basis of the first Fourier transform signal and the second Fourier transform signal; and
- calculates a spectrum of the first light-reception signal on the basis of the first Fourier transform signal from which noise has been removed.

11. The Fourier spectroscopic analyzer according to claim 1, wherein the first light source is a halogen lamp, and wherein the second light source is a light source comprising semiconductor light-emitting element.

12. The Fourier spectroscopic analyzer according to claim 1, further comprising a memory that stores the first light-reception signal and the second light-reception signal, wherein the signal processor calculates the spectrum using the first light-reception signal and the second light-reception signal which are stored in the memory.

13. The Fourier spectroscopic analyzer according to claim 1, wherein the first light source emits light of 1 [μm] to 2.5 [μm] as the first wavelength band and emits light of 0.5 [μm] to 1 [μm] as the second wavelength band.

14. The Fourier spectroscopic analyzer according to claim 2, the Fourier spectroscopic analyzer further comprising:
- a third light source that emits light including the wavelength component in the first wavelength band; and
- a second light coupling optical system that is provided between the first light source and the interferometer and couples light emitted from the third light source to light emitted from the first light source.

15. The Fourier spectroscopic analyzer according to claim 3, the Fourier spectroscopic analyzer further comprising:
- a third light source that emits light including the wavelength component in the first wavelength band; and
- a second light coupling optical system that is provided between the interferometer and the sample and couples light emitted from the third light source to the interferogram acquired by the interferometer.

* * * * *